(12) United States Patent
Nilsson et al.

(10) Patent No.: US 9,313,243 B2
(45) Date of Patent: Apr. 12, 2016

(54) VIDEO STREAMING OVER DATA NETWORKS

(75) Inventors: Michael Erling Nilsson, London (GB); Stephen Clifford Appleby, London (GB); Rory Stewart Turnbull, London (GB); Ian Barry Crabtree, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 250 days.

(21) Appl. No.: 13/997,469

(22) PCT Filed: Dec. 20, 2011

(86) PCT No.: PCT/GB2011/001743
§ 371 (c)(1),
(2), (4) Date: Jun. 24, 2013

(87) PCT Pub. No.: WO2012/085505
PCT Pub. Date: Jun. 28, 2012

(65) Prior Publication Data
US 2013/0297818 A1 Nov. 7, 2013

(30) Foreign Application Priority Data
Dec. 23, 2010 (EP) .................................... 10252205

(51) Int. Cl.
*G06F 15/16* (2006.01)
*H04L 29/06* (2006.01)
*H04L 12/801* (2013.01)
*H04L 12/811* (2013.01)
*H04L 12/927* (2013.01)
*H04L 12/911* (2013.01)
*H04N 21/2343* (2011.01)
*H04N 21/462* (2011.01)
*H04N 19/115* (2014.01)
*H04N 19/152* (2014.01)
*H04N 19/154* (2014.01)
*H04N 19/177* (2014.01)
*H04N 19/192* (2014.01)
*H04N 19/44* (2014.01)

(52) U.S. Cl.
CPC ............... *H04L 65/60* (2013.01); *H04L 47/10* (2013.01); *H04L 47/38* (2013.01); *H04L 47/801* (2013.01); *H04L 47/822* (2013.01); *H04L 65/10* (2013.01); *H04L 65/4084* (2013.01); *H04L 65/4092* (2013.01); *H04L 65/602* (2013.01); *H04L 65/80* (2013.01); *H04N 19/115* (2014.11); *H04N 19/152* (2014.11); *H04N 19/154* (2014.11); *H04N 19/177* (2014.11); *H04N 19/192* (2014.11); *H04N 19/44* (2014.11); *H04N 21/23439* (2013.01); *H04N 21/4621* (2013.01)

(58) Field of Classification Search
CPC ..................................................... H04L 47/10
USPC .................................................. 709/229, 231
See application file for complete search history.

(56) References Cited

U.S. PATENT DOCUMENTS 7,418,037 B1 * 8/2008 Nie et al. ................. 375/240.03
2005/0015259 A1 * 1/2005 Thumpudi et al. ............ 704/500

FOREIGN PATENT DOCUMENTS

| EP | 1 296 479 | 3/2003 |
| EP | 2 219 342 | 8/2010 |

OTHER PUBLICATIONS

International Search Report for PCT/GB2011/001743, mailed Apr. 11, 2012.
B. Crabtree et al., "Equitable quality video streaming", BT Group Chief Technology Office, Ipswich, UK, 2009 (5 pgs.).

* cited by examiner

Primary Examiner — Adnan Mirza
(74) Attorney, Agent, or Firm — Nixon & Vanderhye P.C.

(57) ABSTRACT

A client device receives streamed encoded content data, such as encoded video data, which has been encoded at a constant perceptual quality. Several different versions of the content are available to be streamed to the device, at different perceptual quality levels. In order to decide which quality level to request from a content server at intervals the device calculates the delivery rates that would be required for each level of quality. The delivery rates are calculated in dependence on so-called critical points, which are points at which a piecewise constant bit rate delivery schedule is just equal to the decoding schedule. There are two classes of critical points, being a first class of critical points, referred to herein as "additional critical points", which are points on the decoding schedule where, for any particular other point on the decoding schedule before an additional critical point, and assuming that a minimum threshold amount of data is buffered when delivery occurs from the particular point, a constant bit rate delivery schedule that is calculated for the particular point taking into account the buffered minimum amount of data and of such a rate such that buffer underflow does not occur is substantially equal to the decoding schedule. A second class of critical points, referred to herein as "downstairs critical points", is also defined, which are derived from the decoding schedule as a whole, and which are the points at which a piecewise monotonically decreasing constant bit rate delivery schedule (the so-called "downstairs" schedule), which is calculated such that when delivering the encoded content data from the start buffer underflow does not occur, is substantially equal to the decoding schedule of the encoded content data. When the actual delivery rate received is ahead of the so-called "downstairs" schedule, then the delivery rate required for a particular quality level can be calculated from the second class of critical points. However, when the actual delivery rate received is behind the downstairs schedule, then the delivery rate required is calculated from the first class of critical points.

16 Claims, 19 Drawing Sheets

| DCP | GoP | ACP | GoP |
|-----|-----|-----|------|
| 1 | 232 | 1 | 456 |
| 2 | 867 | 2 | 754 |
| 3 | 1347 | 3 | 1542 |
| ... | ... | ... | ... |

32

| GoP | Q1 | | Q2 | | Q3 | |
|-----|-----|------|-----|------|-----|------|
|  | CBC | 0-SUD | CBC | 0-SUD | CBC | 0-SUD |
| 1 | 150 | 1.57 | 250 | 1.78 | 330 | 2.1 |
| 2 | 300 | 1.83 | 450 | 2.02 | 575 | 2.6 |
| 3 | 480 | 1.67 | 780 | 2.1 | 860 | 2.7 |
| 4 | 780 | 1.23 | 1000 | 1.8 | 1380 | 2.4 |
| ... | ... | ... | ... | ... | ... | ... |

VIDEO STREAMING OVER DATA NETWORKS

This application is the U.S. national phase of International Application No. PCT/GB2011/001743 filed 20 Dec. 2011 which designated the U.S. and claims priority to EP Patent Application No. 10252205.9 filed 23 Dec. 2010, the entire contents of each of which are hereby incorporated by reference.

TECHNICAL FIELD

The present invention relates to a method and system for the determination of data transfer rate required for the streaming of variable bit rate encoded video data over a network. In some embodiments the determined data transfer rates are then used to select a video quality to be provided over the network for reproduction.

BACKGROUND TO THE INVENTION

Traditionally a video on demand service, such as that provided commercially in the UK under the trade name BT Vision, is supported by encoding video at a constant bit rate and delivering it over a network at the same constant bit rate. This generally requires bandwidth reservation on the network, which can be expensive to provide. Video encoded using compression techniques naturally has variable bit rate, as the number of bits produced when encoding a picture depends on the picture content: how similar it is to previously encoded pictures and how much detail it contains. Some video scenes can be coded to a given quality with a small number of bits, whereas other scenes may require significantly more bits to achieve the same quality. When constant bit rate (CBR) encoding is used, video has to be coded at time varying quality to meet the bit rate constraint. This has been shown to be sub-optimal to the user, who would prefer to see constant quality. Also, by fixing the bit rate independent of the genre of the video content, some genres of content can be encoded well, such as news and drama, whereas others, such as fast moving sport and music videos and concerts, can only be coded quite poorly.

In order to address the perceived image quality issues with CBR encoded video, variable bit rate (VBR) encoded video can be provided, where the video is encoded at a variable rate so as to provide for substantially constant quality. In this respect, WO 2009/112801, incorporated herein by reference in its entirety for all purposes, describes how video data may be encoded to allow for substantially constant perceived quality on the part of a viewing user. However, due to the variability of instantaneous bit rate of VBR encoded data, delivery of variable bit rate encoded data over a network can itself be problematic, if the network is to deliver the data sufficiently quickly such that all video data is delivered in time for it to be decoded and displayed without interruption. In particular, parts of the VBR encoded data which have a high number of bits per frame, such as action sequences or the like, may lead to high instantaneous data rate requirements which the network is unable to deliver. Such situations may then lead to buffer underflow at the decoding client, and hence interruptions in delivery.

In order to avoid such buffer underflow conditions occurring it is therefore important to control carefully the data transfer rate and video data quality (which itself dictates the amount of data to be delivered) such that quality can be improved where possible, whilst preventing buffer underflow conditions occurring.

SUMMARY OF THE INVENTION

In one embodiment of the invention a client device receives streamed encoded content data, such as encoded video data, which has been encoded at a constant perceptual quality. Several different versions of the content are available to be streamed to the device, at different perceptual quality levels. In order to decide which quality level to request from a content server at intervals the device calculates the delivery rates that would be required for each level of quality. The delivery rates are calculated in dependence on so-called critical points, which are points at which a piecewise constant bit rate delivery schedule is just equal to the decoding schedule. There are two classes of critical points, being a first class of critical points, referred to herein as "additional critical points", which are points on the decoding schedule where, for any particular other point on the decoding schedule before an additional critical point, and assuming that a minimum threshold amount of data is buffered when delivery occurs from the particular point, a constant bit rate delivery schedule that is calculated for the particular point taking into account the buffered minimum amount of data and being of such a rate such that buffer underflow does not occur is substantially equal to the decoding schedule. A second class of critical points, referred to herein as "downstairs critical points", is also defined, which are derived from the decoding schedule as a whole, and which are the points at which a piecewise monotonically decreasing constant bit rate delivery schedule (the so-called "downstairs" schedule), which is calculated such that when delivering the encoded content data from the start buffer underflow does not occur, is substantially equal to the decoding schedule of the encoded content data. When the actual delivery rate received is ahead of the so-called "downstairs" schedule, then the delivery rate required for a particular quality level can be calculated from the second class of critical points. However, when the actual delivery rate received is behind the downstairs schedule, then the delivery rate required is calculated from the first class of critical points.

In view of the above, from one aspect there is provided a method for delivering encoded content data over a network, the content data being encoded at one or more quality levels, the method comprising: determining one or more respective data rates required to deliver the encoded content data at the one or more quality levels; and selecting a quality level for delivery in dependence on at least the one or more determined respective data rates; the method being characterised in that the determining of a data rate for a particular quality level comprises: being provided with pre-calculated data defining one or more critical points of a first type on a decoding schedule of the encoded content data of the particular quality, the critical points of the first type being points at which, for one or more other points on the decoding schedule and assuming that when delivery occurs from those points a minimum threshold amount of encoded content data is buffered, a constant bit rate delivery schedule calculated for the one or more other points such that buffer underflow does not occur is substantially equal to the decoding schedule; wherein when actual delivery of the encoded content data is behind a piecewise monotonic decreasing constant bit rate delivery schedule required to deliver the encoded content data from the start so that buffer underflow does not occur, and at least the minimum threshold amount of content is buffered, calculating the data rate required for delivery of remaining encoded data at the particular quality level in dependence on at least the critical points of the first type.

In an embodiment of the invention a critical point defines a cumulative bit count Bdcp at a specific time Tdcp in the decoding schedule of a set of encoded content data of the particular quality level.

In one embodiment there is further provided pre-calculated data defining one or more critical points of a second type on the decoding schedule of the encoded data at the particular quality level, the critical points of the second type being points at which the piecewise monotonic decreasing constant bit rate delivery schedule is equal to the decoding schedule.

In this embodiment the calculating may further comprise calculating a respective data rate for each critical point of the first type on the decoding schedule between the present delivery point and the next critical point of the second type; and selecting the maximum calculated data rate as the data rate for the particular quality.

In one example embodiment the calculation of a data rate in respect of a critical point further comprises: determining a latest timepoint Tr in the set of encoded content data at which already delivered bits will be decoded; determining a cumulative bit count Bd at the latest time Tr; determining the present timepoint Ta in the set of encoded content data corresponding to the data just decoded; and determining the required data rate as the ratio of the difference between the cumulative bit count Bdcp of the critical point and the cumulative bit count Bd at the latest time Tr, and the difference between the time Tdcp of the critical point and the present timepoint Ta.

In another example embodiment when actual delivery of the encoded content data is behind a piecewise monotonic decreasing constant bit rate delivery schedule required to deliver the encoded content data from the start so that buffer underflow does not occur, and there is less than the minimum threshold amount of content buffered, then the data rate is calculated in dependence on a pre-calculated zero start-up delay rate, and a further data rate calculated as if there had been the minimum threshold amount of content data available in the buffer. Within this embodiment the data rate may be interpolated between the further data rate and the pre-calculated zero start-up delivery rate.

In another example embodiment when delivery of the encoded content data is ahead of the piecewise monotonic decreasing constant bit rate delivery schedule, calculating the data rate required for delivery of remaining encoded data at the particular quality level in dependence on at least the critical points of the second type. Within this embodiment the calculation of the data rate may comprise: determining a latest timepoint Tr in the set of encoded content data at which already delivered bits will be decoded; determining a cumulative bit count Bd at the latest time Tr; determining the present timepoint Ta in the set of encoded content data corresponding to the data just decoded; and determining the required data rate as the ratio of the difference between the cumulative bit count Bdcp of at least the next critical point of the second type and the cumulative bit count Bd at the latest time Tr, and the difference between the time Tdcp of at least the next critical point of the second type and the present timepoint Ta.

Within some embodiments of the invention the data rate is calculated in respect of a plurality of sets of encoded video data of a respective plurality of qualities.

In some embodiments of the invention a set of meta-data relating to encoded content data to be received is stored, the meta-data comprising pre-calculated data relating to properties of the sets of encoded content data of the plurality of qualities. Within these embodiments the set of meta data may comprise, for each set of encoded content data of a particular quality, for each unit of encoded data in a set, one or more of: a cumulative bit count, and a zero-start up delay rate value. In addition, within these embodiments the set of meta-data may further comprise the pre-calculated data defining the one or more critical points of the first type and/or the one or more critical points of the second type.

From another aspect of the invention these is provided a method of operating a content server, comprising: storing a plurality of sets of encoded content data, encoded at a plurality of constant perceptual qualities; streaming the encoded content data of one of the sets of a first quality to a client device operating in accordance with any of the preceding claims; receiving requests from the client device to stream encoded content data of a second perceptual quality; and streaming the encoded content data of the set of the requested second quality to the client device.

Within this aspect an embodiment of the invention may further store meta data relating to the stored sets of encoded content data, the meta-data comprising pre-calculated data relating to properties of the sets of encoded content data of the plurality of qualities, wherein the set of meta data optionally comprises, for each set of encoded content data of a particular quality, for each unit of encoded data in a set, one or more of: i) a cumulative bit count, and ii) a zero-start up delay rate value.

In addition, in one example embodiment the video content server generates the meta-data by analysing the sets of encoded content data. The analysis of the sets of encoded content data includes analysing the data to determine the positions of the critical points of the first type.

BRIEF DESCRIPTION OF THE DRAWINGS

Further features and advantages of the present invention will become apparent from the following description of an embodiment thereof, presented by way of example only, with reference to the accompanying drawings, wherein like reference numerals refer to like parts, and wherein:

FIG. 3 is a set of tables of pre-calculated meta-data;

DESCRIPTION OF THE EMBODIMENTS

An embodiment of the invention will now be described, by way of example only. More particularly we describe below the operating environment of the present embodiment in terms of the system architecture of the embodiment, and a brief overview of operation. We then address how a required data transfer rate can be calculated for a particular encoded video file (or other "chunk" or set of video data) when the received data rate is in excess of that required to allow timely reproduction of the whole file or chunk. Thereafter we describe how the required data rate can be found when the received data rate is behind that required to permit timely reproduction of the whole file (or chunk).

Overview, and Operating Environment

In the embodiment of the invention to be described we model the network as one or more network based video servers connected to one or more video receivers over a shared network. Multiple pieces of video content are encoded at a number of constant quality levels and stored on one or more of the network based servers. In response to requests from users, video content is selected on a server and delivered over the shared network to the user. The system selects the quality level to deliver based on the video content currently being delivered, the amount of video data already buffered at the video receiver, and the available network throughput. One of the aims of the embodiment is to adapt the quality of video delivered according to the available network throughput so as maximise the quality of video delivered while ensuring that all video data is delivered over the network in time for it to be decoded and displayed without interruption.

As background to the understanding of the embodiment, a video sequence that has been encoded at variable bit rate can be delivered over a network at piecewise constant bit rate, with the rate of each piece decreasing monotonically. The resulting bit rate profile is referred to herein as a "downstairs" function. Our international patent application (Ghanbari and Sun), published as WO2004/047455, describes one method of analysing a video sequence that has been encoded at variable bit rate to determine a video delivery schedule for that sequence consisting of one or more contiguous periods of constant bit rate delivery in which the rates are monotonically decreasing.

Figure 4:
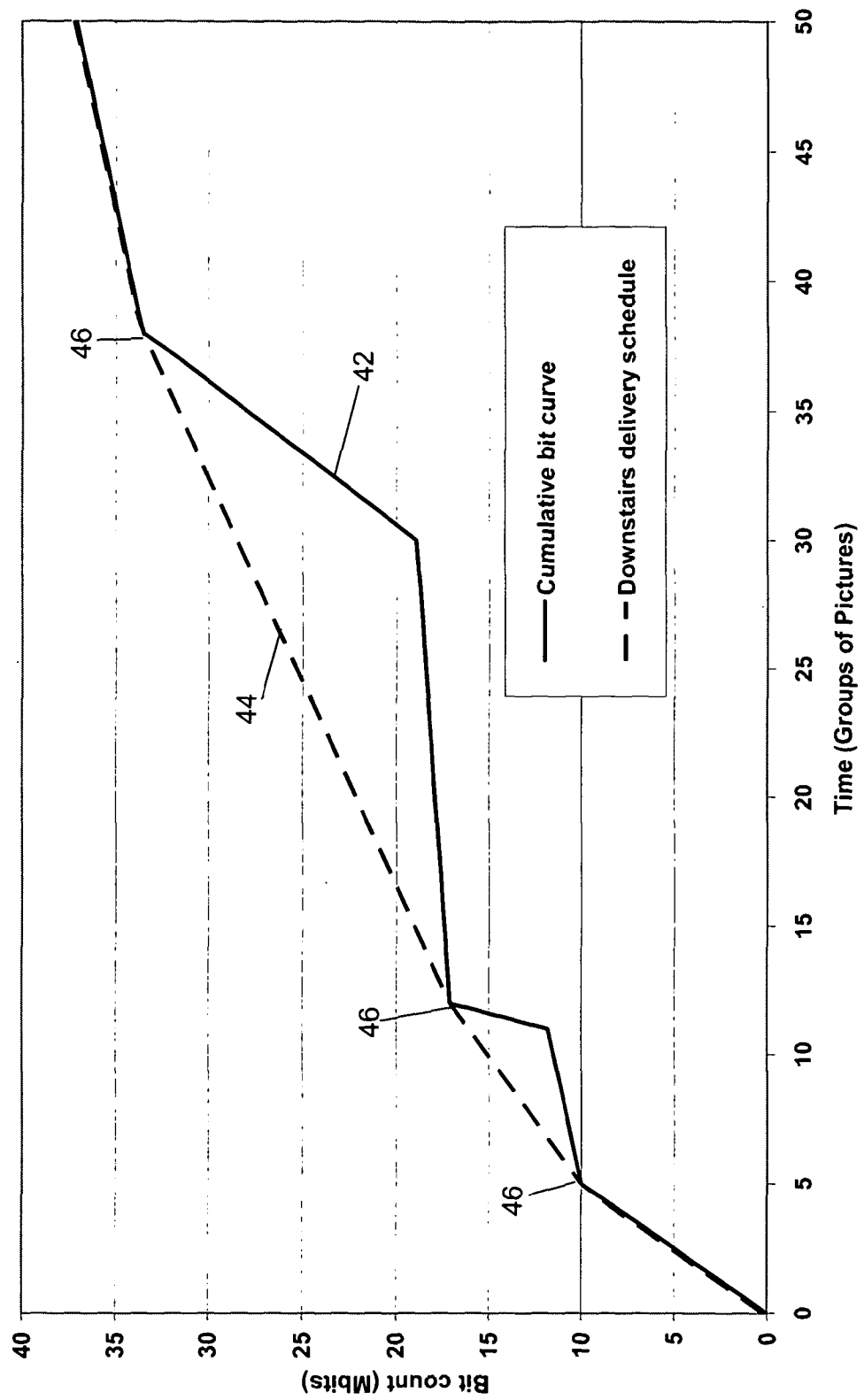
FIG. 4 is a graph of a cumulative bit curve.

An alternative visualisation is described in our international patent application WO2010/067050, where the cumulative number of bits in the encoded video sequence is plotted against time. An example of such a cumulative bit curve (also referred to as the decoding schedule) is shown in FIG. 4. This is simply a plot of the total number of bits in the coded video sequence to date against time. The "downstairs" delivery rate required for initial delivery of this stream is the slope of the line of lowest slope that passes through the origin and is never to the right of the cumulative bit profile, that is, ensuring all bits are delivered before they are needed for decoding. Such a delivery line (or delivery schedule) will touch the cumulative bit curve in one or more places, but typically only once. When delivery to that point (or the last of those points) in the video sequence has occurred, all video bits delivered will be decoded and no bits will be buffered awaiting subsequent decoding. From this point onwards, a new line of lowest slope could be calculated, and the next coded video bits delivered at this lower rate. These points where the delivery rate just touches the cumulative bit curve, and then changes rate (typically decreasing) are referred to as "Downstairs Critical Points" (DCPs), and are shown as points 46 in FIG. 4. In addition, in FIG. 4 the cumulative bit curve is shown as solid line 42, and the resulting downstairs delivery schedule as dashed line 44. Note that as the delivery rates are shown as straight lines, then they are constant delivery rates between each DCP.

Video that is encoded at constant bit rate will have a cumulative bit curve near to a straight line. Video that is not coded at constant bit rate, for example, video coded with constant quantisation index or with constant perceptual quality will have a cumulative bit curve that in general will not be a straight line. Such video could be transmitted over a network with a delivery schedule similar to the cumulative bit curve, and thus require little buffering in the receiver, or, with unlimited buffering in the receiver, could be delivered with any delivery schedule subject to every bit being received before it is needed for decoding. When plotted on a graph, with time along the horizontal axis and cumulative bits on the vertical axis, this requirement can be expressed as the delivery schedule must never be to the right of the cumulative bit curve. When there is unlimited buffering at the receiver, it is always possible to deliver any bitstream using constant bit rate delivery at any constant rate: it is just necessary to ensure decoding is delayed sufficiently to keep the delivery schedule to the left of the cumulative bit curve. In the extreme case, the whole of the video sequence could be delivered very slowly and decoding started only as the delivery is about to finish.

In the examples considered here, we consider discrete "chunks" each comprising one or more frames. The choice of chunks is subject to the consideration that, in order to keep to a minimum any interdependence of quality between chunks, a chunk can be one or more frames coded independently of any other chunk, typically starting with an I-frame (one coded without prediction from any other frame). In the examples here, the chunk chosen was a group of pictures (GOP) of IBBP format and all the plots shown are of cumulative bits per group of pictures, $\Sigma b$, where b is the number of bits in a group of pictures, plotted against group of pictures index.

In the streaming system envisioned, each video sequence is encoded multiple times, each time with a different level of perceptual quality. As mentioned, encoding at fixed levels of perceptual quality level is preferably performed as described in our co-pending International patent application no. WO 2009/112801. However other methods of encoding could also be used, such as coding with constant quantisation index.

We also assume in the embodiment that the client device has sufficient buffering to be able to store a whole video stream. This allows the timing of delivery of the video data to be decoupled from the decoding of it, provided we ensure data is delivered before it is needed for decoding.

The delivery bit rate required to deliver a video stream in timely fashion depends on how much data is already buffered at the client, and the bit rate profile of the bits yet to be decoded. By analyzing the video stream prior to delivery, and by monitoring the amount of data buffered at the client, we can determine, for each possible quality level that could be delivered, the bit rate required for timely delivery, as will be described later.

The operating environment of the present embodiment will next be described with respect to FIGS. 1 and 2.

Figure 1:
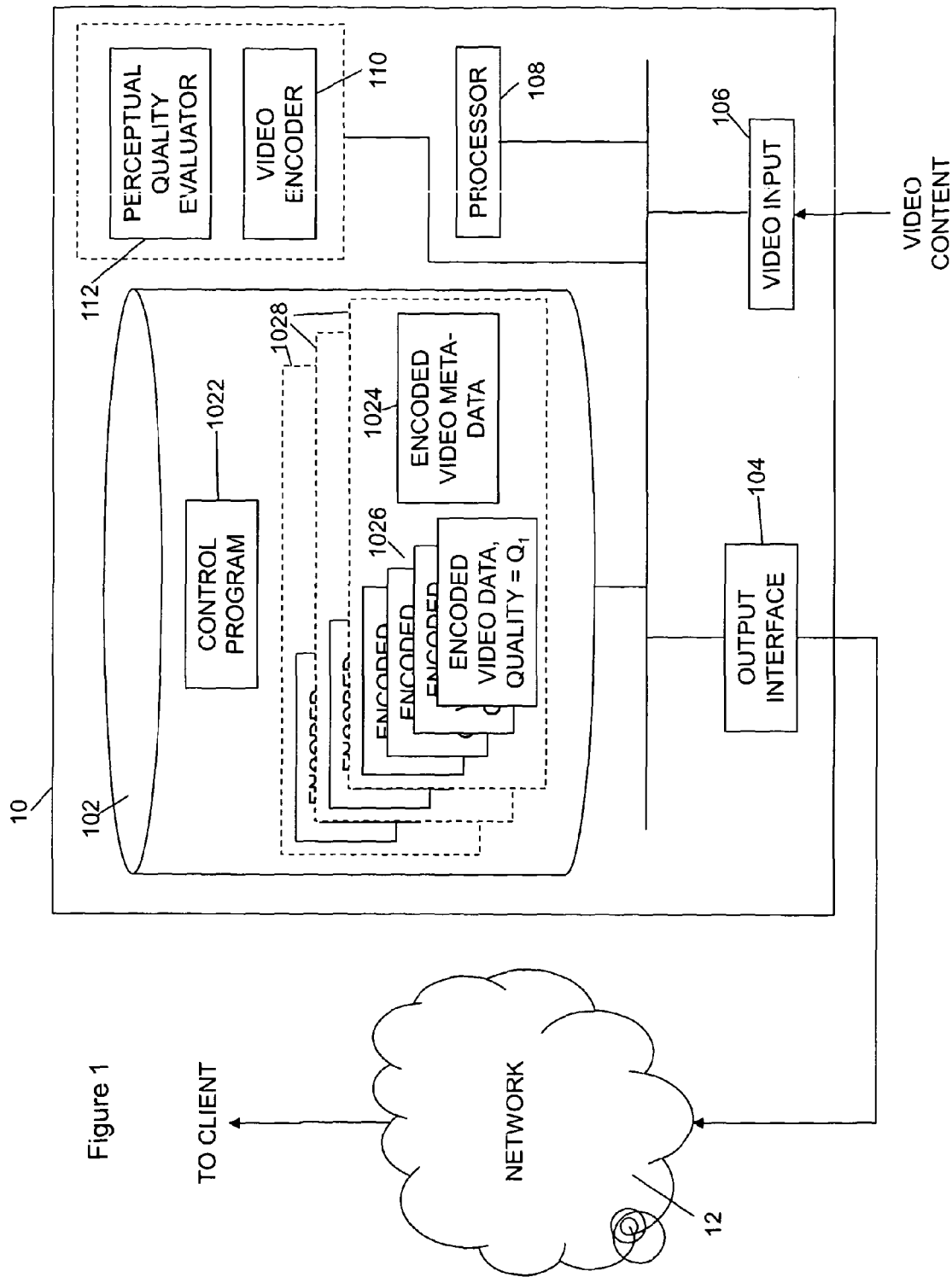
FIG. 1 is a block diagram of a video content server of an embodiment.

More particularly, FIG. 1 illustrates a video content server 10, which is arranged to supply encoded video data to a client for reproduction, via a network 12. The video content server 10 comprises a processor 108, arranged to control a video content server, and to perform any processing required. An input interface, in the form of video input 106 is provided, at which unencoded video content can be input. An output interface 104 is provided, at which encoded video output can be streamed over network 12 to the client. Additionally included is a video encoder 110, and a perceptual quality evaluator 112. The video encoder 110 encodes unencoded video data passed to it, according to at least one known video encoding standard. For example, the video encoder 110 may encode video in accordance with the ITU-T H.264 video coding standard. In addition, the video coder 110 is able to encode video at different qualities, under the command of the perceptual quality evaluator 112. That is, during encoding the perceptual quality evaluator 112 controls the video encoder 110 so that the perceived quality of the encoded video is substantially constant, as described previously.

Video content server 10 also includes a computer readable storage medium 102, such as a hard disk drive, or the like. For example, computer storage medium 102 may be an array of hard disk drives, where significant levels of storage are required. The computer readable storage medium 102 stores a control program 1022 which is run by the processor 108 so as to control the overall operation of video content server, to provide the functions to be described. Also stored on computer readable storage medium 102 are sets of encoded video data 128, each representing an item of video content, for example an individual movie, television program, music video, or the like. Each set of encoded video data 128 comprises multiple encoded versions of the video data 1026, each encoded version being of different video data quality. As shown in FIG. 1 four different quality versions of the encoded video data may be produced, but this is by way of illustration only, and in other embodiments a larger or smaller number of different qualities of encoded video data may be produced, in some embodiments as many as nine. Each set of encoded video data also includes encoded video meta data 1024, containing various pre-calculated data regarding each different quality encoded bit stream. Further details of encoded video meta data 1024 will be described later with respect to FIG. 3.

Figure 2:
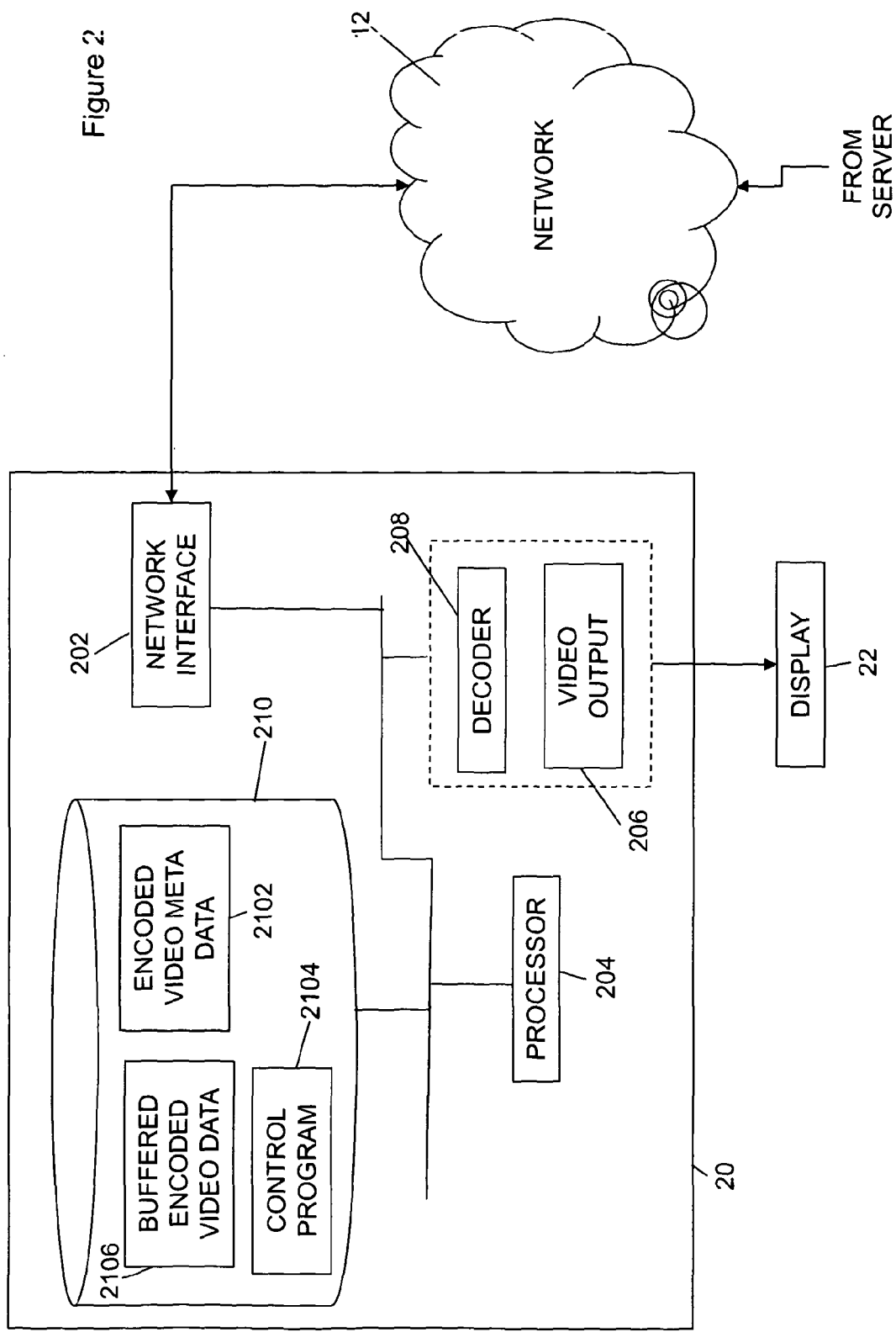
FIG. 2 is a block diagram of a client device of an embodiment.

FIG. 2 illustrates an example client, being a consumer of the encoded video data. In particular, client device 20 comprises a processor 204, and computer readable storage medium 210. Client device 20 also comprises network interface 202, which is able to receive data from and transmit data to network 12. Therefore, network interface 202 receives streamed encoded video data over the network 12 from the video content server 10. Client device 20 also comprises video content decoder 208, which is able to decode encoded content, and provide a video signal to a video output 206, which can then be used to drive a display 22. Display 22 may be integrated with the client device 20, or may, for example, be separate. It will be understood that the client device 20 may be many different types of device, such as, for example, a personal computer, a tablet computer, an internet enabled television, a smart phone, a portable AV player, or the like.

Computer readable storage medium 210, which may, for example, be a hard disk drive, flash drive, or other solid state storage, stores a control program 2104, which controls the operation of the processor 204 to provide the functions to be described. Also stored on computer readable storage medium 210 is buffered encoded video data 2106, which is video data which has been received via the network interface 202, and stored on the computer readable storage medium 210 before it is required by the decoder 208 for decoding, and output as a video signal to drive display 22. In addition, computer readable storage medium 210 also stores encoded video meta data 2102, which is the video meta data relating to the present set of video data that is being received and reproduced by the client device 20, and which has been streamed from the server. Typically, within the embodiment the encoded video meta data 2102 is provided to the client as a first download from the video content server, when the client requests access to particular video content. The video meta data is then stored, and is used in subsequent delivery rate calculations, as will be described.

The content of the encoded video meta data for a particular video file in the present embodiment is shown in FIG. 3. In particular, video meta data 1024 or 2102 (when downloaded to the client device) comprises in this embodiment two tables of data 30 and 32. In particular, table 30 contains entries for sets of video data encoded at different qualities. Therefore, as will be seen, there is a set of pre-calculated data for the encoded video data of quality Q1, Q2, Q3, etc. etc. For a particular quality level pre-calculated data is included for each time base point, in this case measured by group of picture (GoP) index, of the encoded video data. Thus, as will be seen, the actual decoding schedule in the form of the cumulative bit curve is represented, as a series of cumulative bit counts, taken at the end of each GoP. In addition, a second value, which is a delivery rate value, referred to as the zero start up delivery rate is included. This is the delivery rate that is required moving forwards in the decoding schedule from the particular GoP against which a particular rate is indexed if no data is buffered, and no start-up delay is to be experienced. Thus, it follows that, that for higher quality levels, where more bits need to be delivered, the zero start up delay delivery rate for the same GoP, will usually be higher (although it does depend on the particular encoding). Likewise, the cumulative bit count at a particular GoP for increasing quality levels, will also increase.

In addition, the meta data also includes a second table 32, which indicates where in the decoding schedule the downstairs critical points occur. Hence, table 32 contains an index to downstairs critical points, against the GoP numbers at which they occur. In addition, table 32 also contains where in the decoding schedule so-called "additional critical points" (ACPs) occur. These are additional points that are pre-calculated and are used to determine rates locally for GoPs, and in particular when the actual delivery schedule has been behind that defined by the downstairs delivery schedule. Further details of the ACPs and how they are used in the present embodiment will be given later. In this example a separate table is included for each quality Q1, Q2, etc.

It should be noted that the specific numbers given in tables 30 and 32 of FIG. 3 are purely by way of example only and should not be taken as indicative of actual values that may be obtained for a particular video file.

It will be appreciated that the specific values included in tables 30 and 32 of the meta data 1024 are specific to each set of video data 1028 that is encoded at different quality levels. Hence, when the client device 20 requests a new video file to be streamed to it, the specific encoded video meta data 1024 for that video file must be provided to the client device, and stored thereat, so that the client device can determine particular delivery rates required whilst the video content is being streamed to it.

Figures 10, 11:
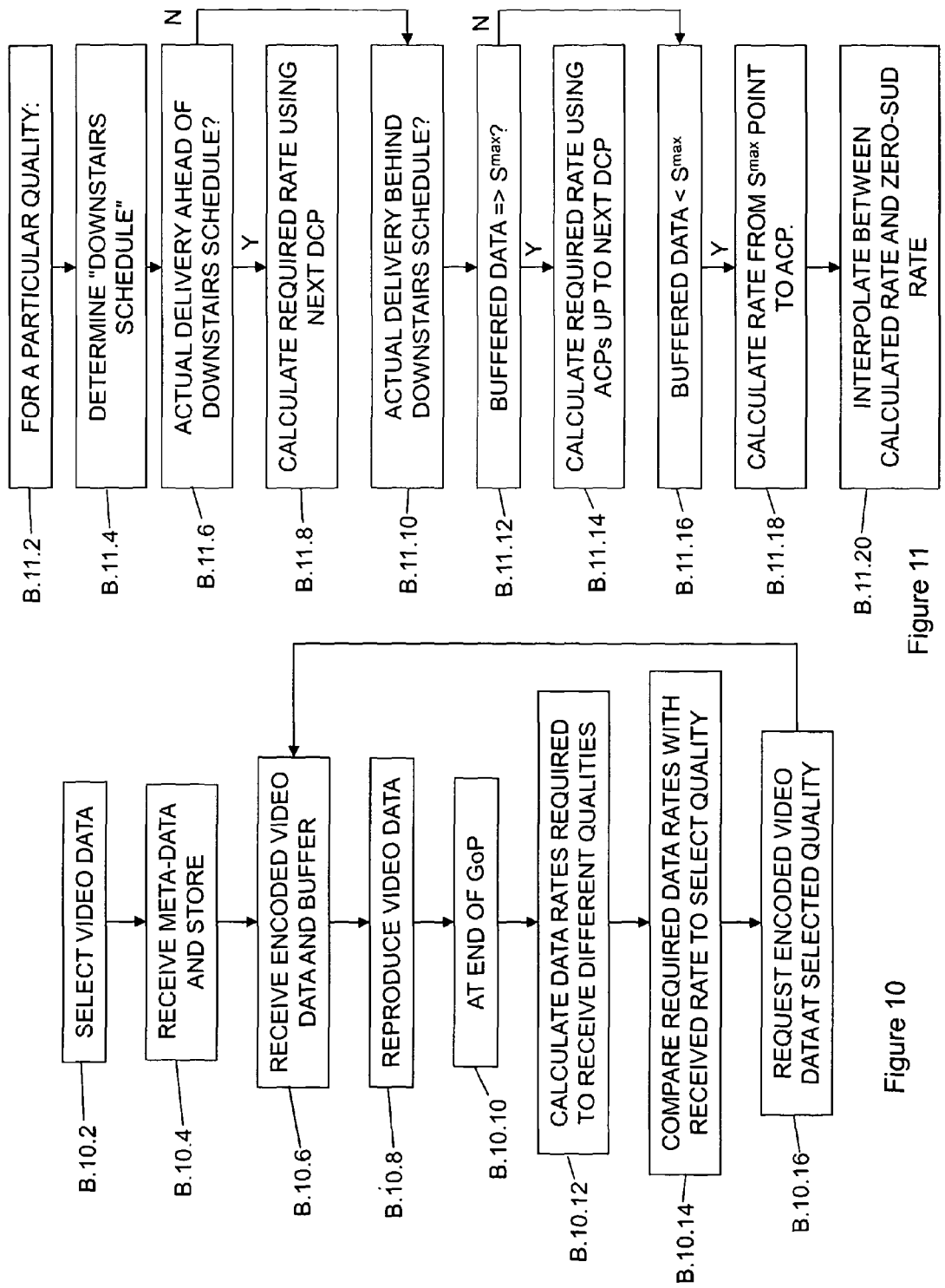
FIG. 10 is a flow diagram of the operation of the client device in an embodiment of the invention.
FIG. 11 is a flow diagram illustrating the processing performed to calculate data rates in an embodiment of the invention.

Having described the general system architectural overview of the embodiment of the invention, FIG. 10 illustrates the overall operation of the client device 20. In the embodiment, the client device 20 operates under the control of control program 2104, to allow a user to select a particular video program to be delivered from the video content server, for display. Once the user has selected the program, the client device 20 then controls the download and display of the content as will be described.

More particularly, at block 10.2 the client device 20, under the control of the user, selects a particular video data set 1028, such as a movie, or the like, to be downloaded from the video content server 10. That is, the processor 204 controls the network interface 202 to send a request to the video content server 10 in order to start streaming the requested video file to it. The request is received at output interface 104, and the processor 108 then causes the video content server 10 to download the encoded video meta data file 1024 for the requested video file to the client device. Therefore, at block 10.4, the client device 20 receives the encoded video meta data at the network interface 202, and stores it as encoded video meta data 2102, on the computer readable storage medium 210. The video content server 10 then starts to stream the encoded video data 1026 via the output interface 104 over the network 12 to the network interface 202 of the client device 20. A particular start up quality may be provided, or an arbitrary quality may be provided, such as, for example, the lowest quality, or the medium quality. Alternatively, the client device may have monitored the network delivery rate of the encoded video meta data 2102, and based on this data rate, and the data in the encoded video meta data, had determined which quality may be supported by the received data rate at which the encoded video meta data 2102 was delivered, using the techniques for delivery rate calculation, to be described. The client device 20 may then request the video content server 10 to initially provide video content data at the quality determined to be supported by the data rate.

Whichever quality is first provided, at block 10.6 the client device receives the encoded video data and passes the encoded video data to the decoder 208, which starts to consume the video data at the rate of the decoding schedule for the particular quality of the video data that is being delivered. Any excess data that is not required for immediate consumption is stored as buffered encoded video data 2106 on the computer readable storage medium 210, and is retrieved from the buffer 2106 via the decoder as required. It therefore follows that if the encoded video data is being delivered faster than the decoding schedule, then more and more data will be buffered in the buffer 2106. If, however, the encoded video data is being delivered at a rate less than the decoding schedule requires, then the buffer may underflow, and decoding and reproduction may temporarily halt. The decoder 208 reproduces the video data at block 10.8, and the reproduced video data is then output from video output 206, to display 22 for reproduction.

From time to time, the client device 20 should evaluate the delivery rate that it is actually receiving, in order to determine whether in fact a higher quality of video can be supported by the delivery rate, or whether quality needs to change to, for example, a lower quality. In the present example this is performed at the end of reproduction of every group of pictures, as shown at block 10.10. That is, at the end of each group of pictures (typically 24 frames or the like) the client device 20 makes use of the pre-calculated data in the encoded video meta data 2102, together with a measure of how much data is buffered, and the delivery rate that it has already seen, to calculate data rates that would be required from that point in time to receive the different available qualities of encoded video available. This is performed at block 10.12, and further details of how these calculations are performed will be described below. The output at block 10.12, however, is, for each quality that is available, a data rate that is required for delivery of that quality. These data rates can then be compared at block 10.14, with the rate that the client device has already been seeing, and a particular quality selected. For example, if the data rate that has been received so far is high enough to support a higher quality video, then that quality is selected, and then subsequently requested at block 10.16. In one example, the quality which most closely matches the viewed throughput is selected, with the proviso that the rate required for that quality must be less than the viewed delivery rate. Other factors, such as the amount of data buffered at the client, may also be taken into account when making the decision of which quality of video to transmit next. For example, it may be decided not to switch to a higher quality if less than a threshold of data, such as that which would take five seconds to display, were buffered at the client, or it may be decided to switch to a lower quality if a lesser threshold of data were buffered, regardless of how the expected network throughput compares to the delivery rate required for each quality of video encoding.

Howsoever the next quality is selected compared to the data rates, as noted at block 10.16 the client then requests the video content server 10 to supply encoded video data at the selected quality.

As noted, this procedure of data rate calculation, and quality selection can repeat as often as required, and in the particular example can be repeated as often as every group of pictures, as it is possible to change between the different encodings at the start of any group of pictures.

We have thus presented a general architectural level overview of the present example embodiment, including the system components, and their operation. Next we describe the specifics of how the particular data rates are calculated in block 10.12. Two different methods are generally used in the embodiments, depending on whether delivery has been ahead of the downstairs delivery schedule, calculated using the downstairs critical points, or whether it has been slower than the schedule given by those points.

Figure 5:
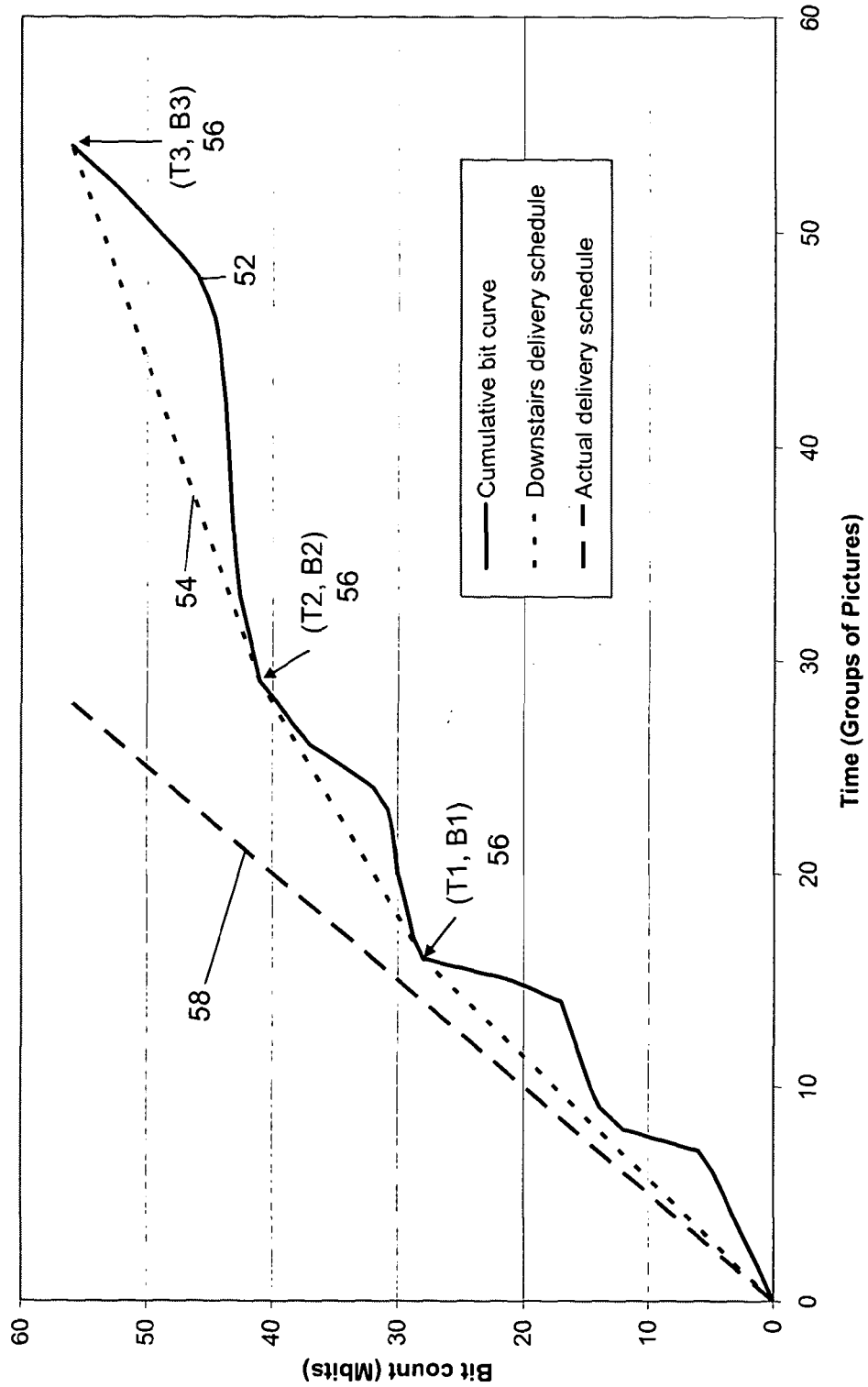
FIG. 5 is a graph of a cumulative bit curve.

Delivery Rate Calculation when Delivery is Ahead of the Downstairs Delivery Schedule Similar to FIG. 4, FIG. 5 shows a cumulative bit curve 52 for a video sequence encoded at variable bit rate and its piecewise constant, monotonic decreasing, delivery schedule, referred to as the "downstairs delivery schedule" 54. But it also shows a delivery schedule 58 for constant bit rate delivery at a rate faster than necessary for timely delivery. As discussed previously, at B.10.12 after delivery of each group of pictures, we calculate the required delivery rate for timely delivery of the next and all subsequent groups of pictures. In the present case, this requires knowledge of the "downstairs delivery schedule" across the cumulative bit curve, which is readily obtained from the meta data 2102, and in particular using the data in table 32 relating to DCP position in the GoP sequence, and the cumulative bit counts for those GoPs identified as DCPs. For example, the downstairs delivery rate between start-up and the first DCP is the ratio of the cumulative bit count ("CBC") at the DCP to the time at the DCP. Likewise, the rate between the first DCP and the second DCP is the ratio of the CBC difference between the first and second DCPs, and the time difference between the first and second DCPs.

Having determined the downstairs delivery schedule (or been provided with it), and knowing that it has been exceeded, in the present example then instead of using the other pre-calculated data in the meta-data, we observe that it is possible to calculate the required delivery rate simply by calculating the rate required to intercept with the "downstairs delivery schedule" at the points at which its slope changes, i.e. at the "critical points". By then selecting the maximum of these rates as the required delivery rate, the delivery rate can be determined. We proceed as follows, with reference to FIG. 5.

Let the actual delivery rate be D bits per group of pictures period. Let the time be t, also measured in group of pictures periods. Let the critical points be (T1, B1), (T2, B2) and (T3, B3) with T1, T2, and T3 being the times of the critical points, and B1, B2 and B3 being the number of bits that need to be delivered by those times. At time t, D times t bits would have been delivered. The rates R1, R2, and R3, required to deliver sufficient bits to satisfy each critical point are given by Equation 1.

$$R1 = \frac{B1 - D \cdot t}{T1 - t}$$
$$R2 = \frac{B2 - D \cdot t}{T2 - t}$$
$$R3 = \frac{B3 - D \cdot t}{T3 - t}$$
[1]

where t<=T1<=T2<=T3.

The required delivery rate, R, is then calculated as the maximum of these rates R1, R2, and R3, as given by Equation 2.

$$R = \text{Max}\{R1, R2, R3\}$$
[2]

Clearly from a visual representation, such as FIG. 5, when t=0, the most critical point will be (T1, B1) and the required delivery rate will be R1. But at some subsequent time, (T2, B2) will become the most critical point, and the required delivery rate will be R2. We can determine this time by setting R1=R2 in Equation 1, and by re-arranging it to find t, as in Equation 3.

$$t = \frac{B2 \cdot T1 - B1 \cdot T2}{B2 - B1 - (T2 - T1) \cdot D}$$
[3]

In the case of FIG. 5, this happens at t=12. And by substituting this expression for t into Equation 1 for R1 (or for R2, as at this time they are equal), we get Equation 4

$$R1 = R2 = \frac{B2 - B1}{T2 - T1}$$
[4]

This delivery rate is the same as the downstairs rate for delivery between time T1 and time T2.

Figure 6:
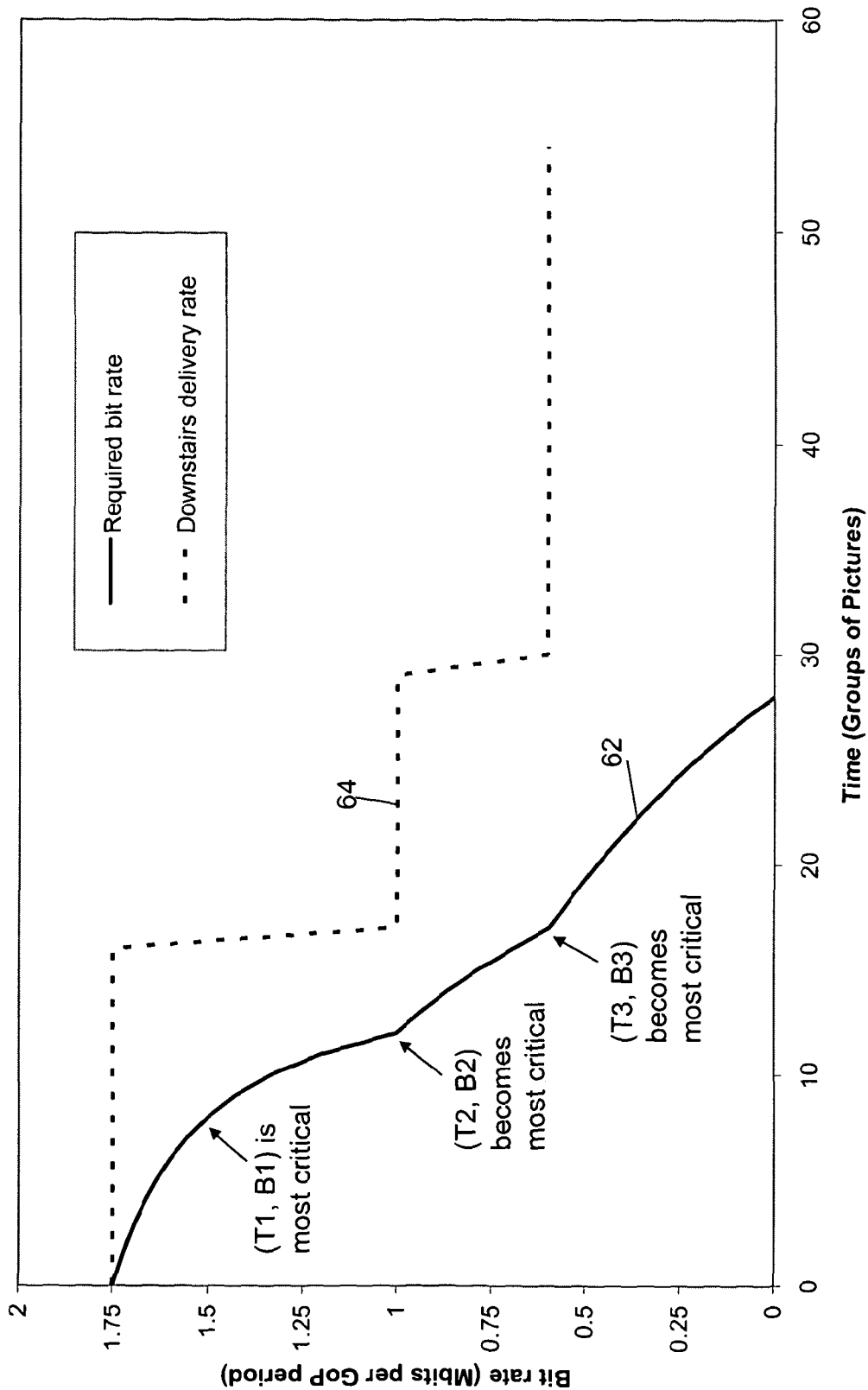
FIG. 6 is a graph of a plot of required bit rates calculated in an embodiment of the invention.

FIG. 6 shows how the required delivery bit rate 62 varies with time for the scenario of FIG. 5, showing that as more bits are delivered, the required delivery rate is determined by each of the critical points in turn, and at each transition, the required delivery rate is equal to the "downstairs" delivery rate 64 associated with the newly most critical point.

Hence if delivery is ahead of the "downstairs delivery schedule", that is, if at the current time, more data has been delivered than required by that schedule, then not only can the required rate be calculated from just the critical points, but also it is not necessary to check all of the critical points. On a first calculation, the rates required by each critical point, starting with the one with lowest bit count greater than the currently delivered number of bits, are calculated, iterating until a calculated rate is lower than the immediately previous one. On subsequent calculations it is only necessary to check this same critical point, and then only in the case that the calculated required rate is lower than the "downstairs" rate associated with the next critical point is it necessary to calculate the rate required by that next critical point.

With the above in mind, FIG. 11 illustrates in more detail the actions performed during B.10.12. The first point to note is that the client device 20 calculates rates required for each available video quality, and hence the above is performed for each quality (B.11.2). Once a particular rate is being determined for a particular quality, the downstairs schedule is first determined at B.11.4, either from being calculated as described, or looked up from a previous calculation thereof. At B.11.6 an evaluation as to whether the received rate so far has been such that delivery is ahead of the downstairs delivery schedule. If so, then this will mean that data will be buffered in buffer 2106, and that the rate required going forward will typically be less than that delivered so far, as shown in FIG. 6, where the required forward delivery rate decreases as more and more data is delivered and buffered.

If the delivery is ahead of the downstairs delivery schedule, then at B.11.8 the above noted procedure is performed to calculate the forward delivery rate, using the DCP data, and the CBC data. That is, the rest of the pre-calculated meta-data does not need to be used to calculate the forward delivery rates for each quality, when the historical delivery rate is ahead of the downstairs delivery schedule. Instead, in such a case, only the downstairs critical points are required, and the cumulative bit curve information. Thus, if the network were always able to deliver at least the downstairs delivery schedule (or greater), then the only meta data that would be required would be the DCP information, comprising time index for each DCP, and the CBC data.

Figure 7:
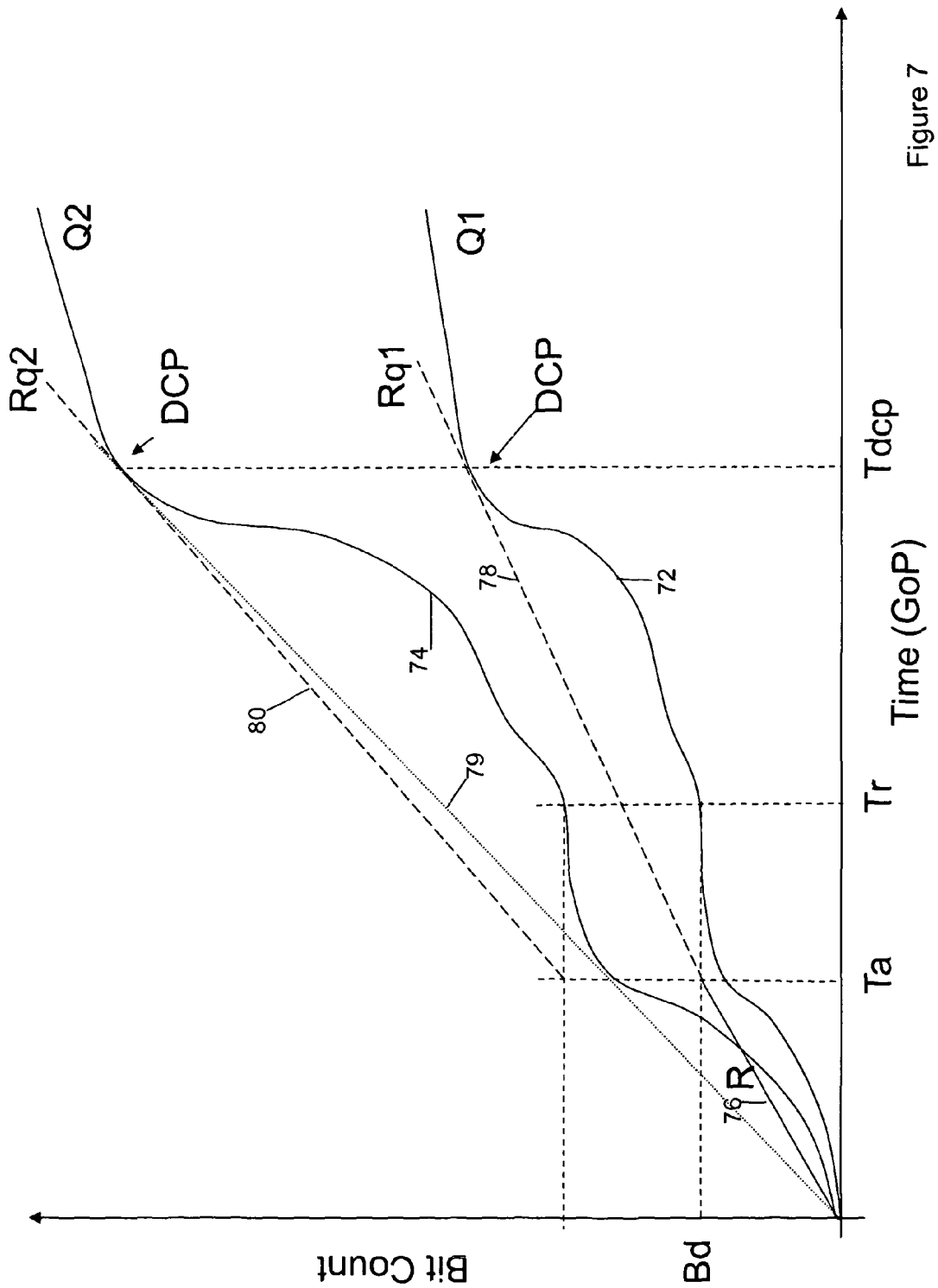
FIG. 7 is a plot of two cumulative bit curves used to illustrate the operation of an embodiment of the invention.

FIG. 7 illustrates an example of the calculation of data rates in accordance with the above for two different qualities. In FIG. 7, assume that encoded video data is being delivered at rate R, shown by line 76, and the encoded data is encoded at quality Q1, such that it has decoding schedule 72. The decoding schedule has a single downstairs critical point (DCP). In addition, in this example the video is also available from video content server 10 at quality Q2, which has decoding schedule 74. Decoding schedule 74 also has a single DCP, which is shown at the same time position Tdcp as the DCP of schedule 72 of Q1, although in other examples it could be at a different time position (and likewise there may be more than one such point). Delivery of Q1 data started at time 0, at rate R, and the present time is time Ta, which we know from the decoder 208, in terms of how many GoPs have been decoded. However, because rate R is greater than the downstairs schedule (not shown) for Q1 encoded data, Bd bits have been delivered. With the decoding schedule 72 of Q1, this means that there are bits in the buffer equal to Tr−Ta GoPs.

The effect of having bits in the buffer is essentially to "buy" time which can then be used in the calculation of the delivery rate required going forward, in that during the time the data in the buffer is being reproduced, the next data to be reproduced after the data in the buffer can be being downloaded. This is important to remember during a switch in quality, for example. In FIG. 7, imagine at point Ta quality was to be switched from Q1 to Q2. However, there are already Tr−Ta units of time worth of bits in the buffer of quality Q1. As there is no point downloading these again they may as well be reproduced at quality Q1, with that amount of time then being used to help download the bits of GoPs at Q2 to be displayed from time Tr.

With the above in mind, to determine the forward rate Rq1 required for continued delivery at quality Q1, a rate is obtained that is the ratio of the bit count at the next DCP of schedule 72 minus Bd bits already delivered, and the time difference between the time of the DCP, and the present time Ta.

However, to calculate the forward rate required for Q2 is slightly more involved, as it is necessary to know how many bits would need to have been decoded at time Tr, from the decoding schedule 74 of Q2, even though no Q2 bits have so far been downloaded and decoded. Whilst the amount of time from the present time Ta to the next DCP of Q2 can be calculated very easily from the DCP data, it is necessary to know how many bits need to be downloaded in that time in order to calculate the required data rate. However, we know that we have sufficient bits in the buffer to reproduce at Q1 until time Tr, and hence there is no point downloading bits from before time Tr of Q2. The number of bits of Q2 that would have been decoded at Tr therefore needs to be subtracted from the CBC at the DCP of Q2, to provide the number of bits that need to be downloaded. The delivery rate is therefore given by the ratio of the cumulative bit count at the DCP of Q2 minus the cumulative bit count of Q2 at Tr, against the amount of time between the present time Ta and the time of the DCP of Q2 i.e. Tdcp−Ta on FIG. 7.

It should be noticed that at the current delivery point for Q2 (i.e. the left end of line 80) delivery is ahead of the downstairs delivery schedule for Q2, shown by dotted line 79. Thus, had data from Q2 been delivered, delivery to get to the current delivery point of Q2 would have had to have been at a greater rate than that determined by the downstairs delivery schedule for Q2. What is important as far as Q2 is concerned is not therefore the actual delivery rate R that has been received (delivering data from Q1), but has been at such a rate that, as far as Q2 is concerned (in addition to Q1), delivery is ahead of the downstairs delivery schedule.

As shown in FIG. 7, forward delivery rate Rq1 is found for Q1, and forward delivery rate Rq2 for Q2. Comparing these rates to historical rate R, it will be seen that Rq1<R<Rq2, and hence R is not sufficient to support the delivery rate required for Q2, but is sufficient to support continued delivery of Q1. Hence, in this example content of quality Q1 is selected for continued delivery.

Delivery Rate Calculation when Delivery is not Ahead of the Downstairs Delivery Schedule While the above is a simple technique, it is limited in its application, as it is restricted to the case of being ahead of the "downstairs delivery schedule". In reality this may not be the case, and hence we will now show how a similar technique can be used in some cases when behind the "downstairs delivery schedule".

Figure 8:
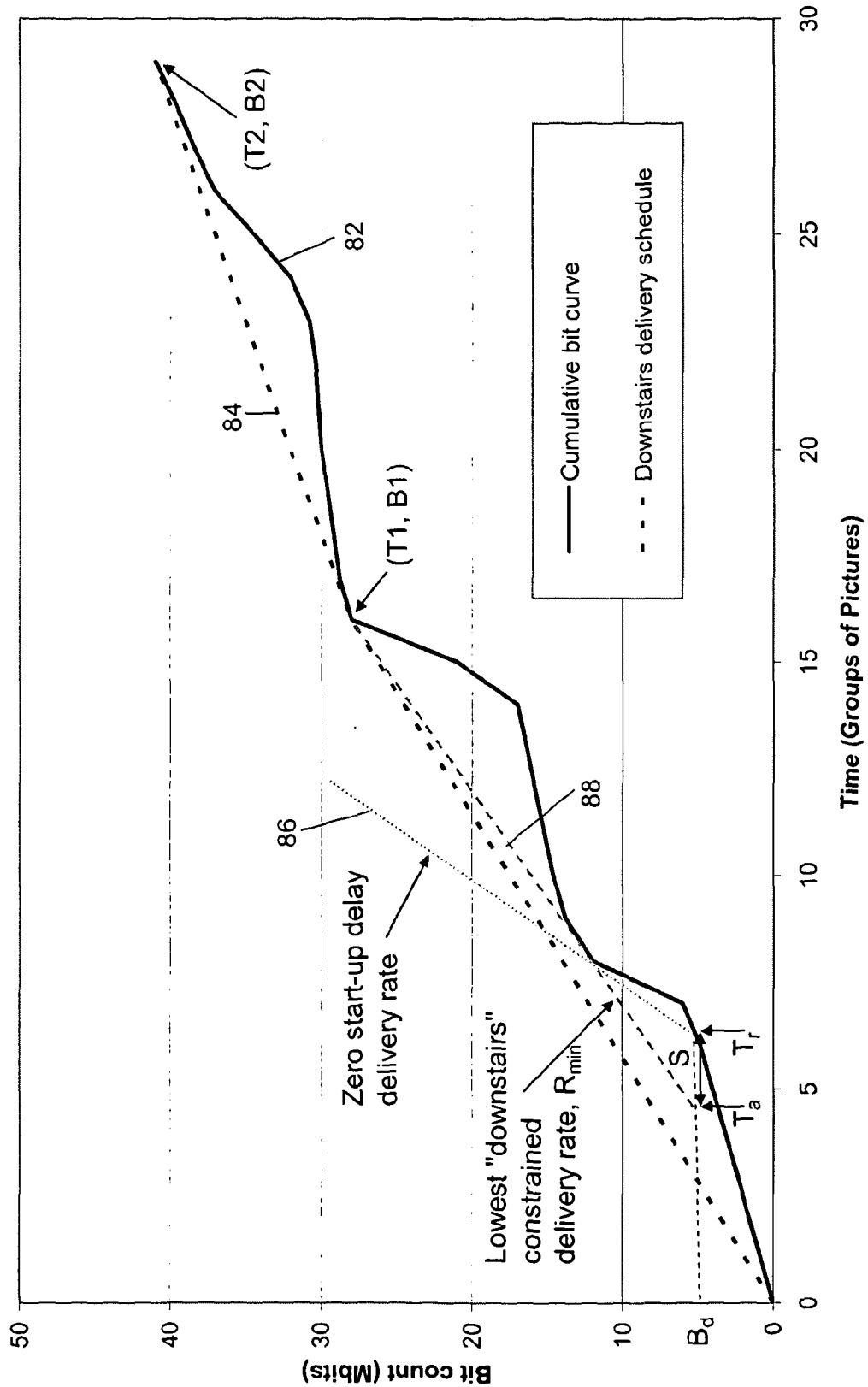
FIG. 8 is a plot of a cumulative bit curve used to illustrate the operation of an embodiment of the invention.

FIG. 8 shows a section of the cumulative bit curve and "downstairs delivery schedule" of FIG. 5. FIG. 8 shows a cumulative bit curve 88, and the associated downstairs delivery schedule 84. In FIG. 8 by way of example let the time when all of the currently transmitted bits will be decoded be $T_r$, and let the current time be $T_a$: this is the time at which the next bits transmitted will start arrive in the decoder buffer. Let $B_d$ be the cumulative bit count at time $T_r$: $B_d$ is indicative of the total number of bits that would have been delivered, if all received data had been encoded at this quality. In order to ensure sufficient bits have been delivered by the time, T1, of the next critical point (T1, B1) on the "downstairs delivery schedule" 84, (B1−$B_d$) bits need to be transmitted between time $T_a$ and time T1, requiring a rate R1 given by Equation 5.

$$R1 = \frac{B1 - B_d}{T1 - T_a} \quad [5]$$

It should be noted that this delivery rate is independent of how many bits are buffered at the decoder and hence independent of which quality of video stream they belong to: what matters is which video stream is to be delivered from this point in time, how much time will elapse before the next bits to be transmitted will be decoded, and how many bits need to be transmitted in the given time period.

While the rate R1 given by Equation 5 is sufficient to meet the demands of the next critical point (T1, B1), it may not be sufficient to deliver all intermediate groups of pictures in a timely fashion. Looking again at FIG. 8, if $B_d$ bits have been delivered in less time than required by the "downstairs delivery schedule", then the current delivery point is on the horizontal dashed line, to the left of its intersection with the "downstairs delivery schedule". In this case the required delivery rate can be determined from knowledge of this point and of all the following critical points on the "downstairs" delivery schedule: the rate R1 given by Equation 5 is sufficient to deliver all subsequent groups of pictures up to the point (T1, B1) in a timely fashion, but the rate required by subsequent critical points (T2, B2), etc, as calculated in Equation 1, must also be considered and the maximum determined, as above, to find the rate required for timely delivery of the remainder of the video sequence.

Figure 13:
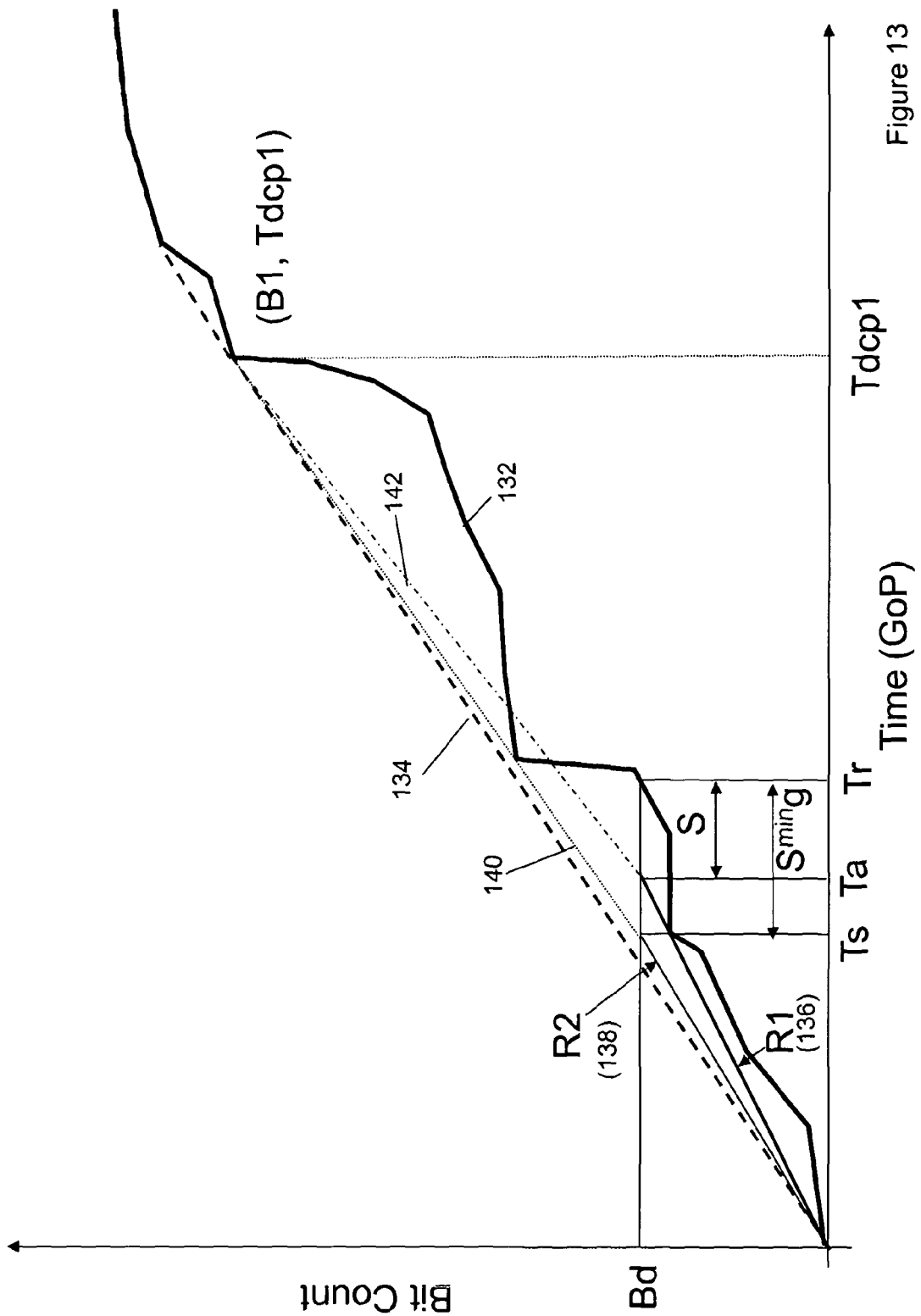
FIGS. 13 and 14 are plots of an example cumulative bit curve that are used to illustrate rate calculation in an embodiment of the invention.

If $B_d$ bits have been delivered in more time than required by the "downstairs delivery schedule", then the current delivery point is on the horizontal dashed line, to the right of the "downstairs delivery schedule", but to the left of the cumulative bit curve, otherwise it would represent an invalid delivery schedule as the bits would not have been delivered in time for decoding. At these points it is not possible to determine the required delivery rate for all possible points on this line segment solely from knowledge of this point and all the following critical points on the "downstairs delivery schedule": there may be points on the decoding schedule that were not critical when starting at the beginning and delivering at the "downstairs" rate but are critical when starting at the current delivery point. FIG. 13 illustrates this point in more detail.

Imagine a video file has decoding schedule 132, and has a downstairs delivery schedule 134, with a first critical point (B1, Tdcp1). However, assume that the delivery rate is less than the downstairs delivery schedule, at rate R1, shown as 136. At time Ta, for example, the client decides to evaluate the rates received and decide whether another quality can be supported. At time Ta in this example, Ta GoPs have been decoded, and there are Tr−Ta=S GoPs in the buffer, waiting to be decoded. Hence, this time S is available to download bits of GoPs which will be displayed after the GoPs already in the buffer.

If at point Ta the client device was constrained to calculate the rate required solely as described above, i.e. by calculating to the next downstairs critical point, then as shown the calculated rate (shown by dot-dash line 142) would cause a buffer underflow shortly after time Tr, as the delivery schedule moves to the right of the decoding schedule. As a consequence, playout of the encoded content would be interrupted, which is not acceptable. Therefore, some other method of rate calculation is required.

One technique is to define a minimum buffer size $S^{min}_g$ for each delivery point at which the DCP could still be used to calculate a valid rate. In FIG. 13 this is shown by $S^{min}_g = Tr - Ts$, from which it can be seen that a constant bit rate shown by dotted line 140 can be calculated to the DCP (B1, Tdcp1) which does not breach the decoding schedule. To achieve this buffer size delivery would have had to have been at rate R2, R2>R1, such that present time i.e. present decoding point is Ts, rather than Ta. By storing for each GoP such a minimum buffer size value, then an evaluation can be made as to whether the DCPs can be used to calculate the rate required.

Figure 9:
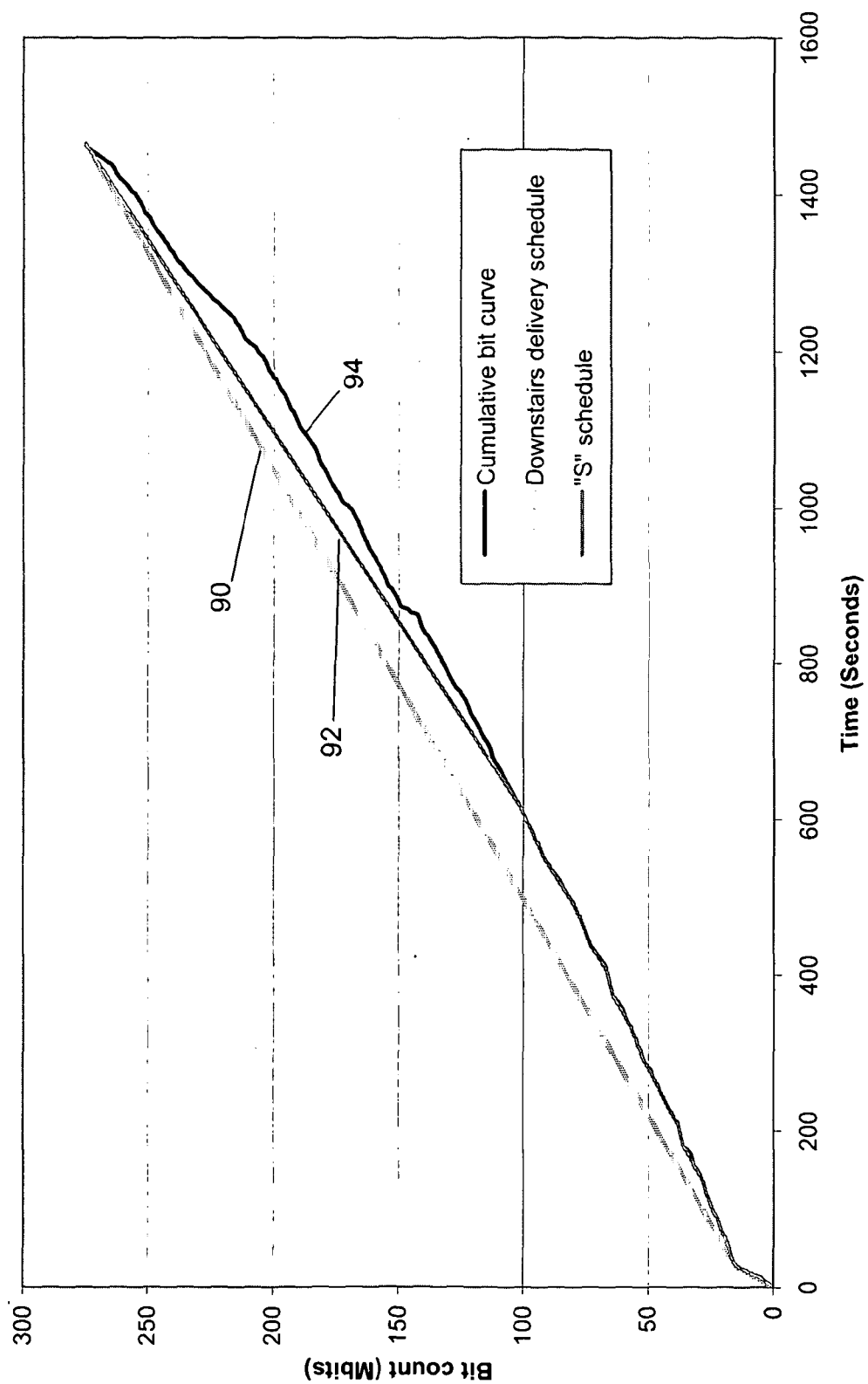
FIG. 9 is a plot showing the variation in a threshold parameter in an embodiment of the invention.

In the present example, however, delivery has been at rate R1 rather than R2, and hence present decoding point is Ta rather than Ts. At point Ta with buffer size S=Tr−Ta, where $S<S^{min}_g$ it is not possible to calculate the rate required for the particular present quality using the DCP. In fact, and dependent on the precise decoding schedule, there can be a large number of GoPs in a piece of encoded content for which rates cannot be calculated without large buffer sizes i.e. large values of $S^{min}_g$. FIG. 9 shows a cumulative bit curve and "downstairs delivery schedule" for a real piece of video content encoded at constant quality. Also shown on the figure is the value of $S^{min}_g$ for each group of pictures, drawn as a curve consisting of one point for each group of pictures, g, at $(g-S^{min}_g, B_g)$. It is observed that for the first 640 groups of pictures (about 615 seconds in this case of 24 pictures per group of pictures and pictures per second), the value of $S^{min}_g$ tends to be low, but subsequently large values occur. The reason for this is not clear from FIG. 9 due to the scale at which it is drawn but is actually due to some groups of pictures just before the end of the video sequence being encoded with only a small number of bits.

Figure 14:
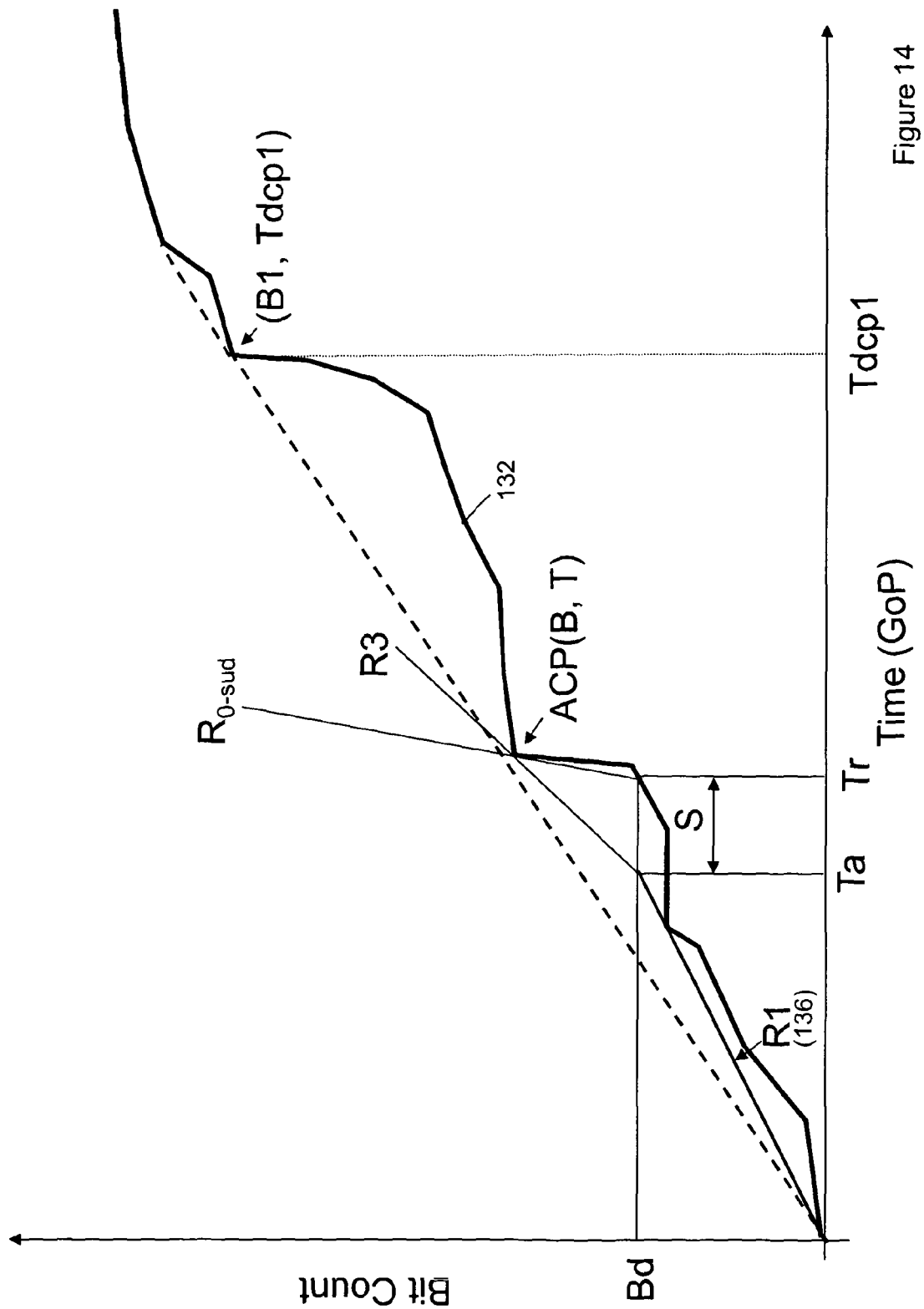

Turning to FIG. 14, instead of using the DCPs to calculate the rate, in order to ensure that decoding can continue uninterrupted a rate R3, as shown in FIG. 14, should be calculated, with reference to an "additional critical point" ACP(B, T), as shown, and that is indicated, in the present embodiment, by the encoded video meta data. By calculating a rate R3 from present decoding point Ta to the additional critical point, and then receiving at that rate, then the client device can ensure that no buffer underflow should occur. One way of looking at such operation is that by adding the additional critical point (ACP) in to the decoding schedule, then the buffer threshold $S^{min}_g$ at which the calculation of rate using the ACP can be performed is significantly reduced. This has the effect of allowing for straightforward rate calculation over a much larger number of GoPs than before, and that does not require much pre-calculated data to be passed to the client. In the present example, the data required includes the cumulative bit curve data, as well as the DCP data, and the additional critical points, that are found as described below.

Figure 15:
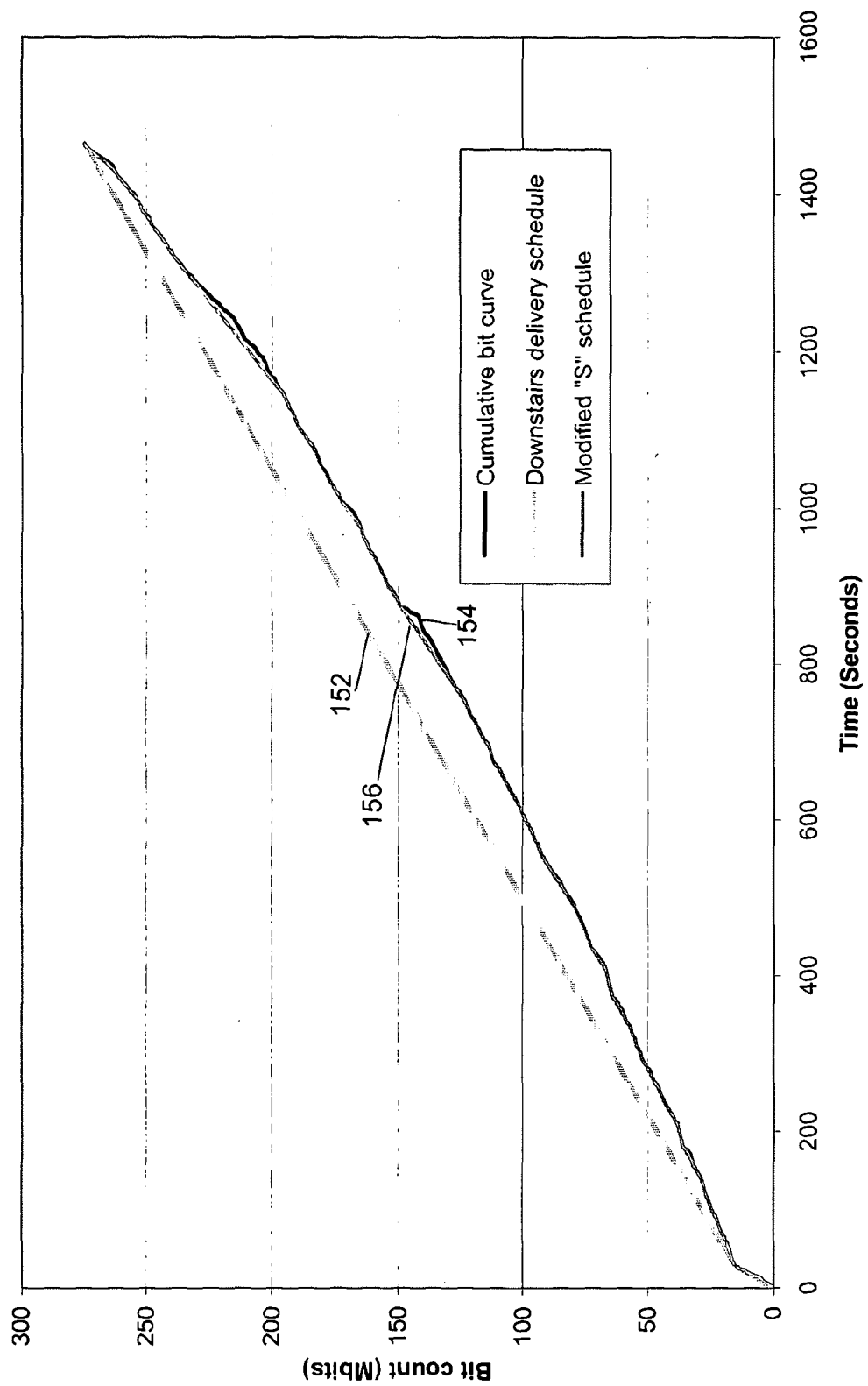
FIG. 15 is a plot of a cumulative bit curve illustrating how adding in an additional critical point can help to reduce required buffer size in an embodiment of the invention.
Figure 16:
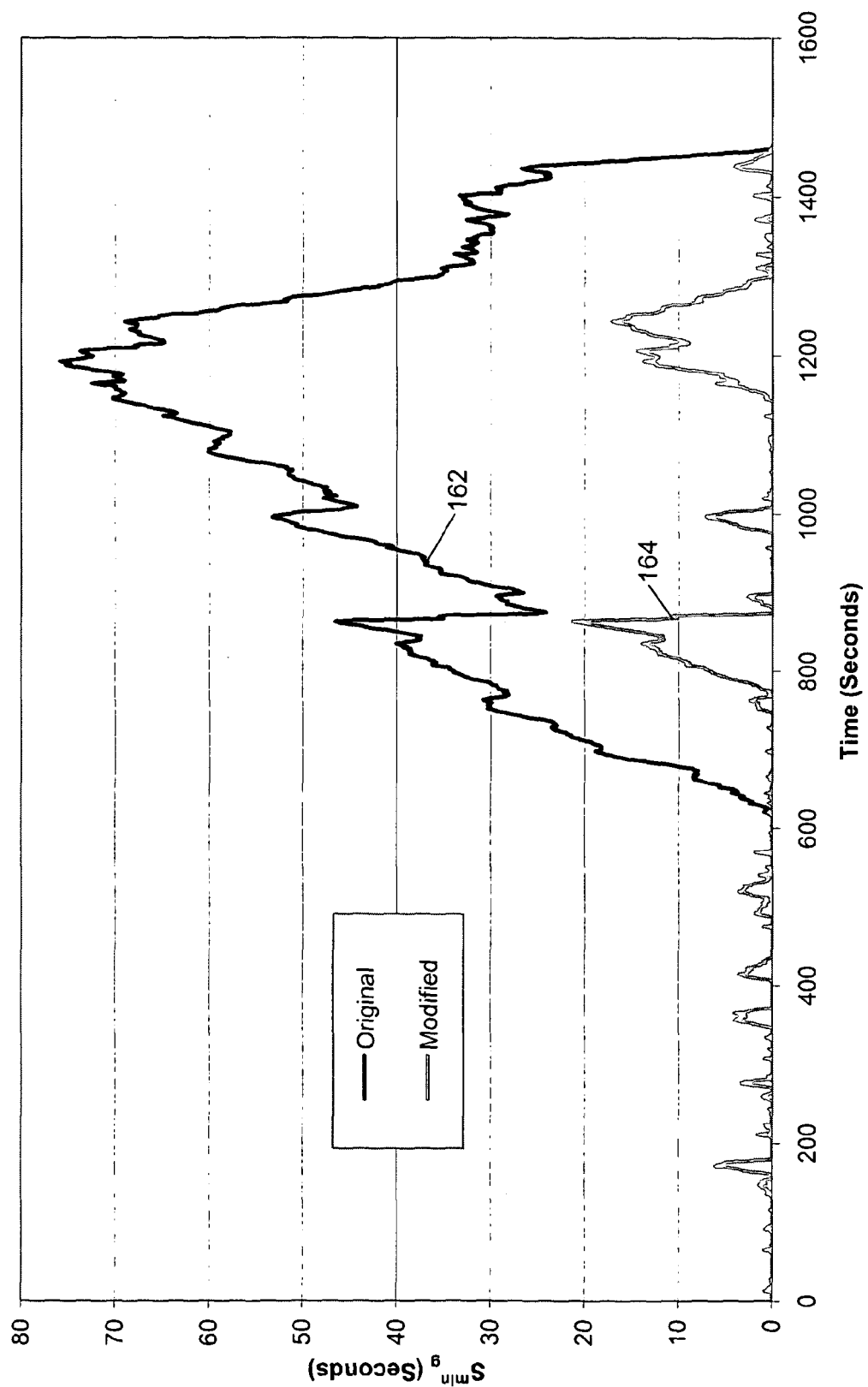
FIG. 16 is a graph showing changes in required buffer size when an additional critical point is added in an embodiment of the invention.

FIGS. 15 and 16 illustrate this in more detail for the example cumulative bit curve of FIG. 9. In particular, FIG. 15 shows the effect of adding one additional point, at group of pictures 1519, to the set of critical points on the "downstairs delivery schedule" of the cumulative bit curve of FIG. 9. In FIG. 15 the cumulative bit curve is shown as line 154, the downstairs delivery schedule for the curve as line 152, and the resulting values of $S^{min}_g$ that are obtained by adding in the additional critical point as line 156. The particular group of pictures at position 1519 was selected as it was the last in the sequence with a number of bits close to the average found in the latter parts of the sequence: subsequent groups of pictures were encoded with significantly smaller numbers of bits. In comparison to FIG. 9, It can be seen that much lower values of $S^{min}_g$ are calculated.

This comparison is even more clear from FIG. 16, which shows the same two sets of values of $S^{min}_g$, but plotted on their own for clarity rather than being relative to the cumulative bit curve. The original and modified values of $S^{min}_g$ are very nearly identical for the first 640 groups of pictures, but afterwards differ significantly. Therefore, by adding in this case only one additional critical point to the cumulative bit curve, in addition to the downstairs critical points, the amount of data that must be buffered $S^{min}_g$ in order to allow a rate to be calculated using the critical points alone is much reduced, with the result that the technique can then be used over a greater number of GoPs of the decoding schedule than otherwise.

More generally, therefore, we try to find more points to add to the set of critical points with the aim of reducing the values of $S^{min}_g$. As noted above we refer to such a set of points as "additional critical points". Note that such sets of "additional critical points" may or may not include any or all of the critical points on the downstairs delivery schedule, depending on which method is used to calculate the sets and depending on the characteristics of the video bitstream.

There are many ways in which these "additional critical points" could be calculated, and two methods are given later. However, the manner in which they are used is the same: provided that the amount of data buffered at the decoder, measured in terms of the time it will take to decode it, is at least equal to a threshold value of $S^{min}_g$ for the next data to be delivered, the delivery rate required to satisfy each of the "additional critical points" and each original critical point could be calculated, with the maximum of these representing the actual required delivery rate precisely. FIG. 11 shows more detail.

In particular, assume that the actual delivery schedule is behind the downstairs delivery schedule, such that the evaluations at B.11.6 and B.11.10 have returned false and true respectively. The next evaluation made at B.11.12 is to look at the buffer 2106 (see FIG. 2) and see how much data is in the buffer waiting to be decoded, and then derive the delivery point Tr from the decoding schedule of the particular quality encoded video data for which a rate is being found. Thus, for example, in the examples of FIGS. 13 and 14, at decoding point Ta with delivery rate R having been less than the decoding schedule there is data in the buffer to reproduce up to point Tr. Hence, the next data to be delivered would need to be from following the delivery point Tr. If the amount of buffered data is more than a pre-set threshold $S_{max}$, for $S^{min}_g$, for example 5 seconds worth, then it should then be possible to find the rate required using either the downstairs critical points, or the additional critical points that are added in. In this respect, as will be described later, calculation of the location of the additional critical points is made in dependence on a particular chosen value for $S_{max}$. If B.11.12 returns true, then processing proceeds to B.11.14, where the rate is calculated from the additional critical points and/or the downstairs critical points.

More particularly, at B.11.14 the rate is calculated as explained above, that is, the delivery rate required to satisfy each of the "additional critical points" and each original critical point could be calculated, with the maximum of these representing the actual required delivery rate precisely. However, it should be noted that it is not necessary to calculate a rate to each "additional critical point" and to each original critical point. Points corresponding to data that have already been delivered are clearly not needed. When the current delivery point is to the right of the "downstairs delivery schedule", only "additional critical points" up to the next original critical point, and that point itself, need to be checked. And when the current delivery point is on or to the left of the "downstairs delivery schedule", it is only necessary to check the appropriate original critical points as has been described earlier in connection with FIGS. 5 to 7, and has would have already been dealt with at B.11.6 and B.11.8.

If at B.11.12 it is determined that the amount of buffered data is less than $S_{max}$, then in one example embodiment it could simply be determined that no rate calculation could be made for the present GoP of the present quality for which a rate is being calculated. In such a case, no new quality selection may be made, and the client may then continue to receive the encoded video at the present rate, at the present quality, until the next time the rates required for particular qualities are evaluated. In such an example embodiment, there would be no need to store the zero start-up delay data in the table 30 of FIG. 3, and hence the amount of pre-calculated data that needs to pass to the client before streaming commences is substantially reduced. In another embodiment another option in the event of being unable to calculate the rate would be to invoke a panic mode and switch as soon as possible to the lowest quality stream. Again, in such an embodiment there would be no need to store the zero start-up delay data.

In another example embodiment, however, as shown in FIG. 11, where less than $S_{max}$ is buffered then evaluation B.11.12 returns negative, and processing proceeds to B.11.16, which returns positive. Then, at B.11.18 a rate is found from a time point as if there was $S_{max}$ in the buffer to the ACP i.e. Tr−$S_{max}$, and ACP(B)−Bd bits had to be downloaded in time ACP(T)−Tr+$S_{max}$. At B.11.20 an interpolation is then performed between this found rate, and the zero delay start-up rate for time Tr, dependent on the actual value of S in the buffer, and the ratio of S to $S_{max}$. This interpolated rate is then used as the forward rate for the present particular quality, during the quality selection in B.10.14.

In terms of the interpolation that is used, in one embodiment a linear interpolation may be used. However, in other embodiments different interpolation techniques may be used, and particularly those described in our prior co-pending patent applications GB 1011047.6, and EP10251540.0, the entire contents of which are incorporated herein by reference for all purposes.

Thus far, therefore, we have described how adding in additional critical points into the decoding schedule can allow rates to be calculated in a very simple manner for a larger number of GoPs than previously, and for a larger range of delivery rates that have been received. In particular, by finding additional critical points based on a threshold value $S_{max}$, for $S^{min}_g$, then rates can be found by determining for a delivery point whether the actual delivered rate has been such as to provide a minimum amount $S_{max}$, in the buffer, and if so, then a rate can be found by calculating rates from the present decoding point to the next additional critical points up to the next downstairs critical point, and selecting the maximum rate found. If there is less than $S_{max}$, in the buffer, then either no calculation of rate is performed, or in some embodiments an interpolation can be performed, based on a pre-calculated zero-start-up delay rate.

The information relating to the location of the additional critical points on the decoding schedule is contained in the encoded video meta data, and stored in table 32 (see FIG. 3). That is, as discussed previously with respect to FIG. 3, an example of a pre-calculated file that is stored as the encoded video meta data would therefore contain, for each group of pictures, for each quality encoded; the cumulative bit count information, and the delivery rate needed for zero start-up delay. In addition, the critical points on the "downstairs delivery schedule", and the additional critical points, found as described below, would be stored once for the entire video sequence for each quality encoded.

Figure 12:
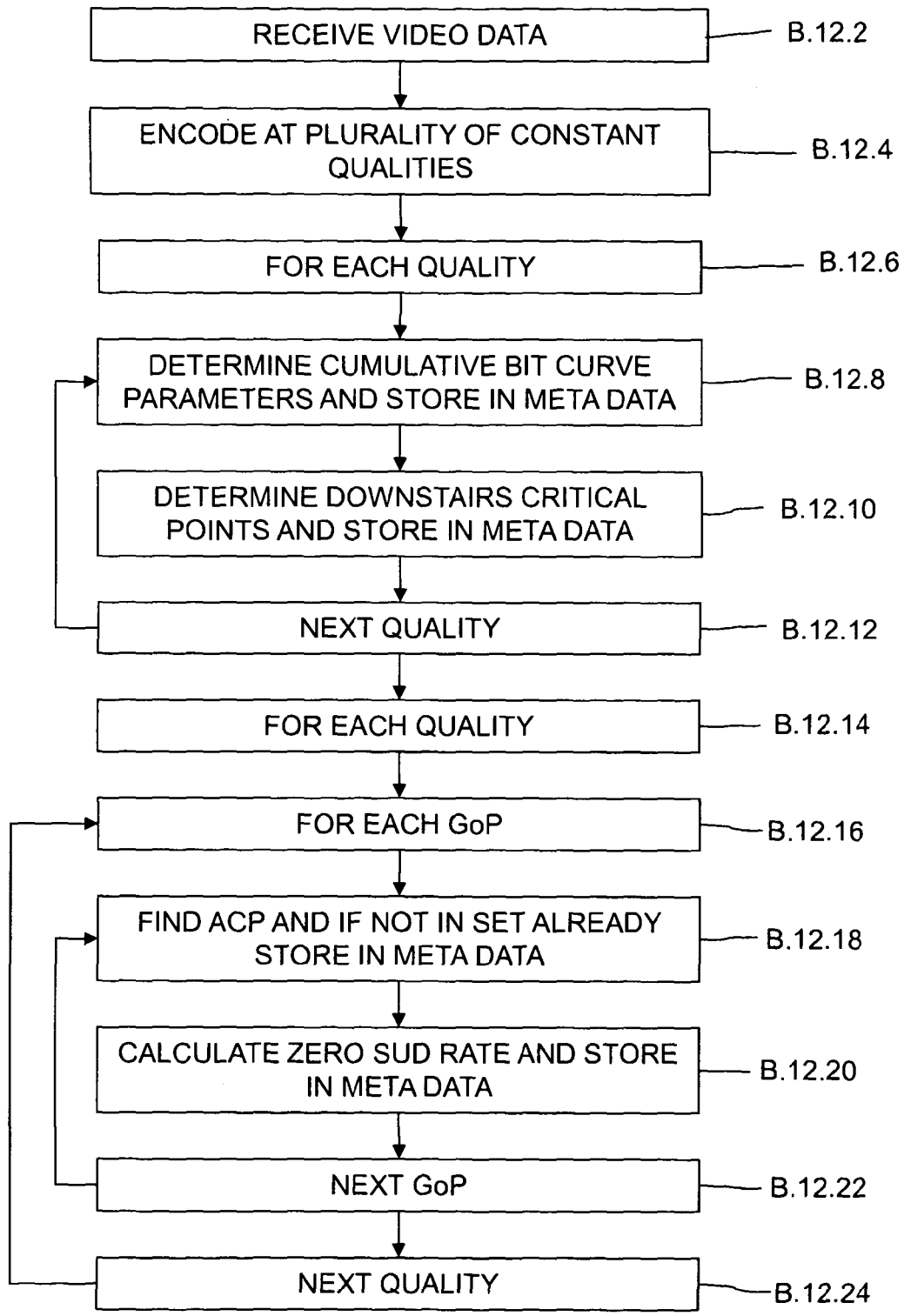
FIG. 12 is block diagram of part of the operation of the video content server of the embodiment.

In terms of the pre-calculation of the encoded video meta data, this is performed in the present embodiment by video content server 10, operating according to the process shown in FIG. 12. Here, imagine some new video content, such as a new movie or the like, is provided to the video content server, at B.12.2. At B12.4 the video encoder encodes the received content to produce a plurality of different encoded versions 1026, each encoded at different constant qualities. These are then stored in storage medium 108, as shown. Next it is then necessary to pre-calculate the meta data 1024 for the set 1028 of different quality encoded data.

At B.12.6 we start a loop to process each encoded video file of different quality in the set 1028, and then for the present encoded file being processed at B.12.8 determine the cumulative bit curve parameters, which are stored in the meta data. These are determined by stepping through the encoded file from GoP to GoP and counting the bits. In addition, once the cumulative bit curve has been found, the downstairs critical points (DCPs) can then be found, from the cumulative bit curve. These are also stored in the meta data file.

At B.12.12. an evaluation is performed as to whether the above has been performed for every different quality level, and if not the next quality level file is selected, and the process repeated. Once all of the different quality files 1026 have been processed, then by that point the cumulative bit curves and downstairs critical points will have been found for each different quality version of the encoded video data.

Next, at B.12.14 another processing loop is started to process each different quality version in turn again. At B.12.16 each GoP is then looked at in turn, with the purpose of determining the location of an "additional critical point" for the GoP, assuming that $S_{max}$ is buffered, and also calculating a zero start-up delay rate for each GoP, at B.12.18, and B.12.20.

Regarding the processing performed at B.12.18 to find additional critical points, we will now describe two example methods for calculating the additional critical points.

In the first example method the upper bound, $S_{max}$, on the values of $S^{min}_g$ is chosen, and the "additional critical points" required to achieve this value are calculated: the end result will be a set of points such that if the parameter $S^{min}_g$ were calculated for each group of pictures, no value would be greater than $S_{max}$, as shown in Equation 6.

$$S_g^{min} \leq S_{max} \text{ for all } g, 1 \leq g \leq G \quad [6]$$

The process must be carried out for each quality at which the video sequence was encoded. For each encoding quality, we consider each group of pictures in turn, and calculate the rate required to satisfy each subsequent group of pictures on the cumulative bit curve when the amount of data (in time units) buffered at the decoder, $S_g$, is equal to $S_{max}$ and find the maximum of these rates and the only or last group of pictures on the cumulative bit curve that requires this maximum rate. The point on the cumulative bit curve corresponding to this only or last group of pictures is included in the set of "additional critical points". This could be visualised as taking each point on the cumulative bit curve in turn, moving to the left by the maximum allowed value, $S_{max}$, and then finding the line of lowest slope passing through that point that just touches the cumulative bit curve, and including the only or last such point in the set of "additional critical points".

Figure 17:
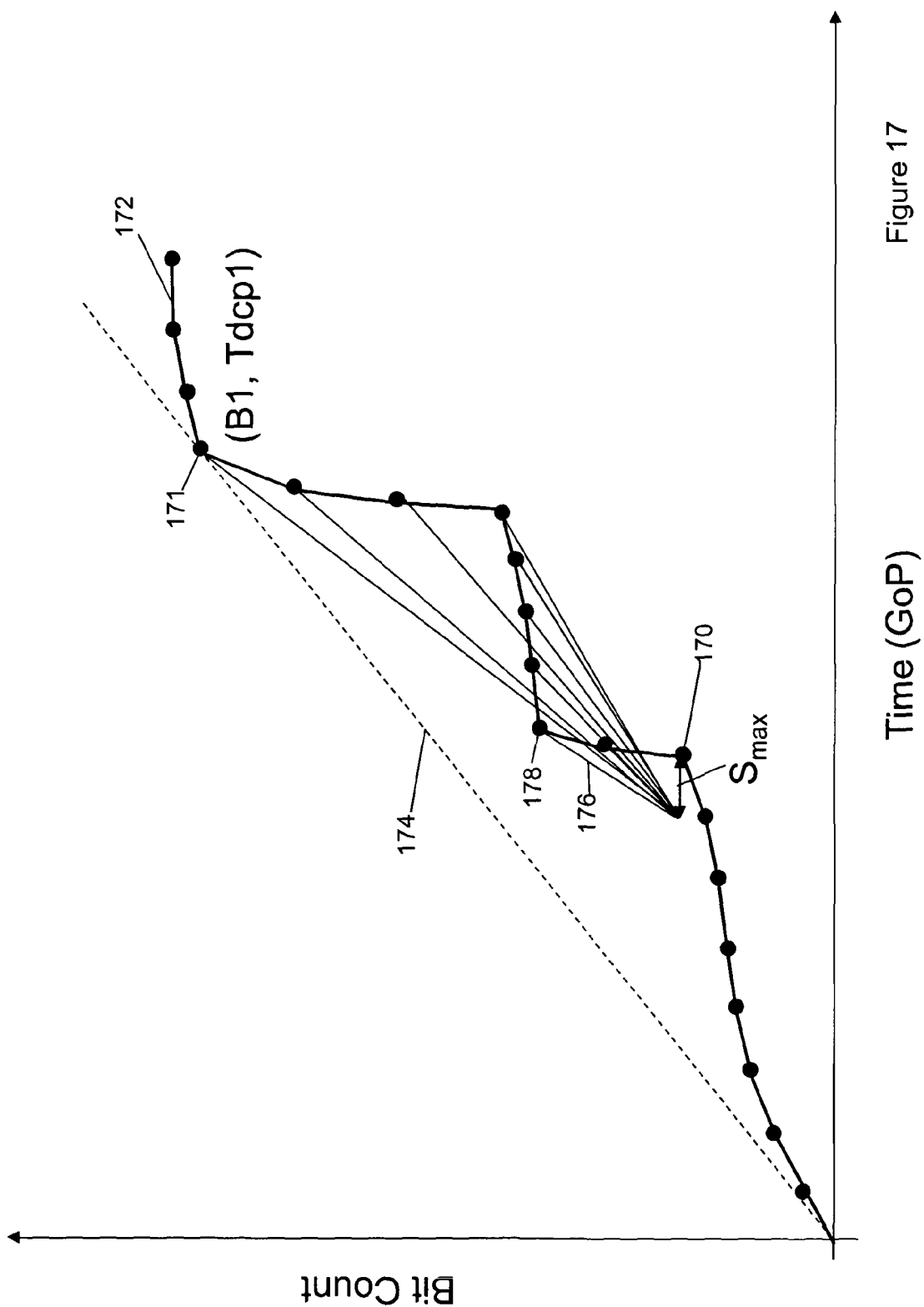
FIG. 17 is a graph of part of a cumulative bit curve showing how additional critical points are found in an embodiment of the invention.

FIG. 17 shows the process graphically. Here, we have cumulative bit curve 172, which has downstairs rate 174, calculated to downstairs critical point 171. Now, imagine we are trying to calculate the critical point on the decoding schedule for point 170, having coordinates (Bd, Td), assuming that there is value $S_{max}$ in the buffer. Having data in the buffer effectively buys time for data to be delivered before it needs to be decoded, and hence moves the starting time back from which the rate calculation needs to be made by the same amount, in this case by $S_{max}$. Therefore, from a point in space equal to (Bd, Td−$S_{max}$), rates are calculated to every other GoP moving forward from the point in question, up to the next downstairs critical point 171. These rates are then compared, and the GoP which gives the maximum rate is selected as a new additional critical point, if it has not already been selected as an additional critical point for another GoP i.e. if it is not already in the list of additional critical points. In the example of FIG. 17, the highest rate calculated is shown by line 176 to GoP 178, and hence GoP 178 would be added to the list of additional critical points, unless it was included in the list already.

This method is described formally as follows for a single encoding quality, q, where the amount of data $b_{qg}$ generated for each group of pictures (g=1 . . . G) has already been calculated, and where $S_{max}$ indicates the maximum allowed value of the parameter $S^{min}_g$, measured in group of pictures periods.

400 Initialise the set of "additional critical points" to be empty. Set a group of pictures index g=1.

410 Set a maximum bit rate parameter $R_{max}$=0. Set a group of pictures index $H_{max}$=0. Set a cumulative bit count B=0. Set another group of pictures index h=g.

420 Set B=B+$b_{qh}$

430 Set R=B/(h−g+1+$S_{max}$)

440 If R<$R_{max}$ go to step 460

450 Set $R_{max}$=R; Set $H_{max}$=h

460 Set h=h+1. If h≤G go to step 420

470 Add the point on the cumulative bit curve with group of pictures index $H_{max}$ to the set of "additional critical points" if it is not already present in it.

480 Set g=g+1. If g≤G go to step 410, otherwise terminate.

Note that in the above the values of h iterate to the end of the video content rather than to the next downstairs critical point, and hence more points are considered as to whether they should be additional critical points than as described previously in respect of FIG. 17. In embodiments of the invention either technique may be used, i.e. look at points all the way to the end of the video content as in the above formal description, or look at points only up to the next downstairs critical point, as shown in FIG. 17.

Figure 18:
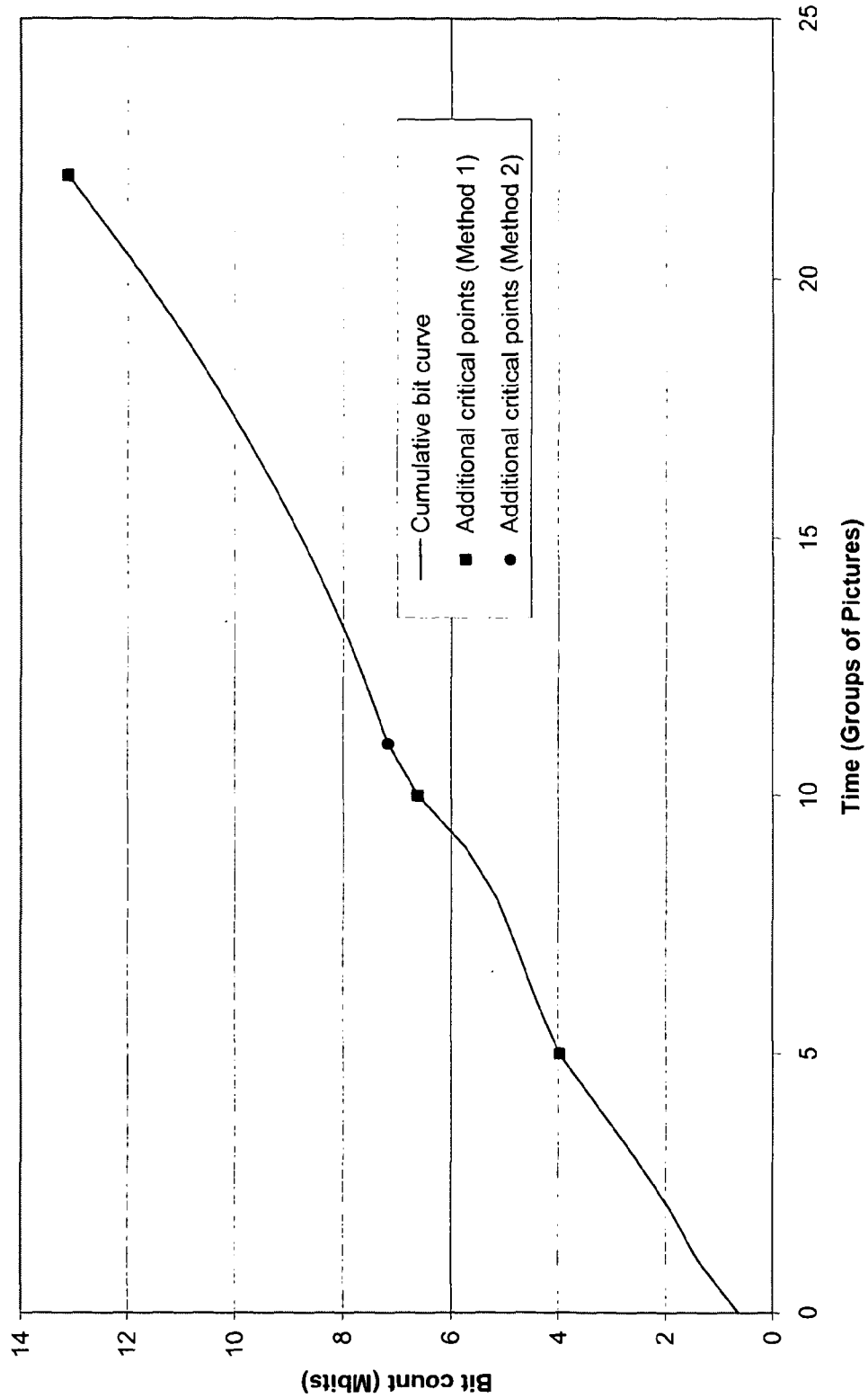
FIG. 18 shows a cumulative bit curve and the "additional critical points" as identified by two methods of calculation.

This first method identifies the points on the cumulative bit curve that need to be known in order to be able to calculate the delivery rate when the amount of data buffered is equal to $S_{max}$. One might imagine that these points would also be sufficient to calculate the delivery rate for any larger amount of buffered data. While this may often be the case, we find that there are cases where this is not true. An example is shown in FIG. 18. This shows a cumulative bit curve and the "additional critical points" found by the above first method when $S_{max}$=0.5 seconds: three such points are found at the groups of pictures with indices 5, 10 and 22. However, when analyzing the delivery of group of pictures with index 10, one finds that when the amount of buffered data, $S_g$, is less than 0.587358276 seconds the required delivery rate is limited by group of pictures 10 itself, and when $S_g$ is greater than 0.618985287 seconds the required delivery rate is limited by group of pictures 22, but for intermediate values of $S_g$ the required delivery rate is limited by group of pictures 11, a point not identified by the above first method.

We find in this example that the maximum error in the calculation of required delivery rate when using the "additional critical points" found by the above first method occurs when $S_g$=0.605230856 seconds, at which the rate is underestimated by about 0.44%.

In the analysis of real video data, we find that the above first method fails to find a small fraction of the "additional critical points", and that the missing ones are generally next to or very close to ones that are identified.

Figure 19:
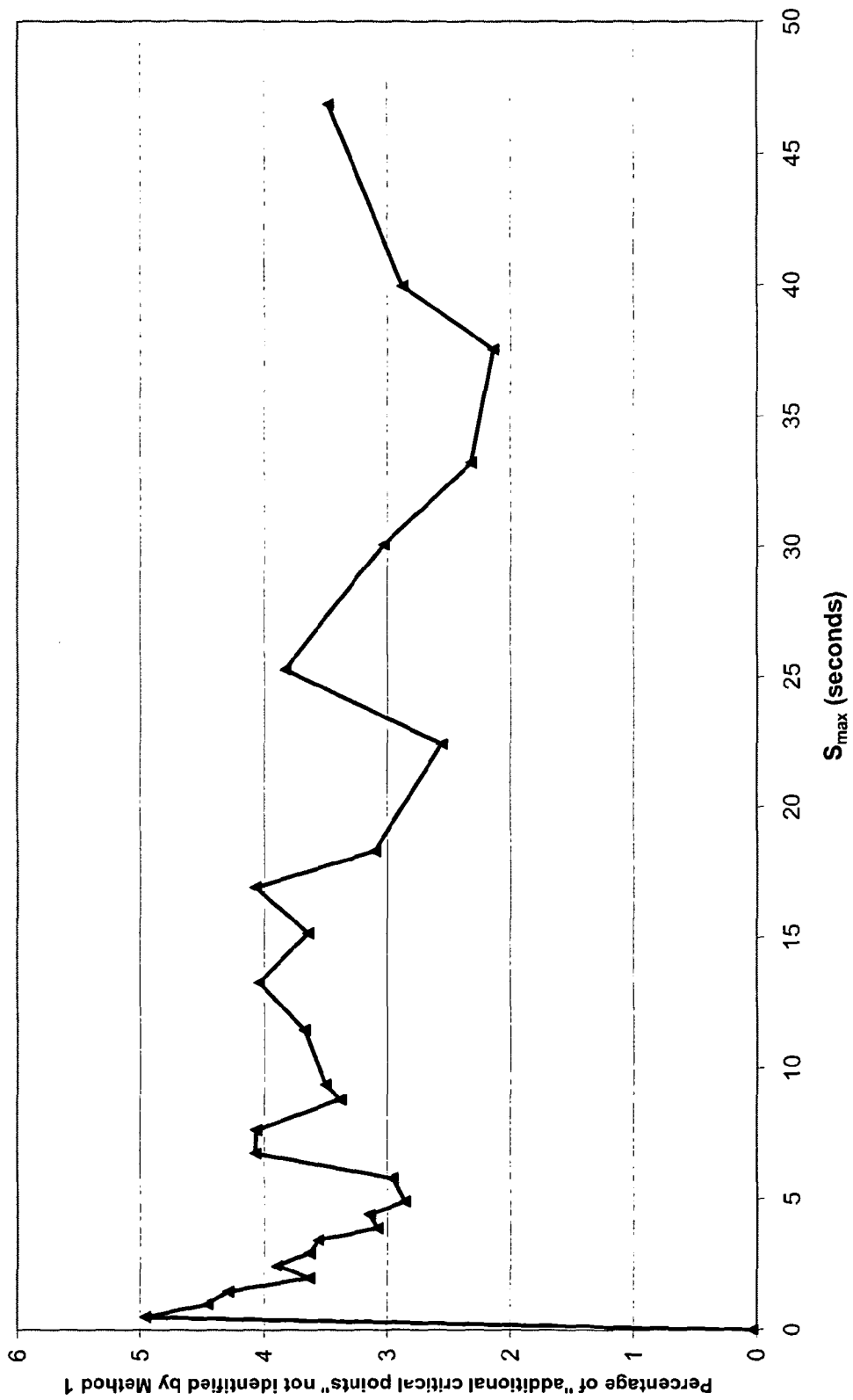
FIG. 19 shows the percentage of "additional critical points" not identified when using the first method of calculation.

FIG. 19 shows the percentage of "additional critical points" not identified when using this first method of calculation: it can be seen that when $S_{max}$ is set to zero, almost all of the "additional critical points" are identified, whereas for larger values, between 2% and 5% are not identified.

As the missing "additional critical points" are only applicable to calculating the delivery rate required for some groups of pictures for some, probably small, ranges of $S_g$ above $S_{max}$, we believe that using the above method to identify "additional critical points" would be suitable to a wide range of applications.

However, we will now describe a second method that does identify all of the "additional critical points". As in the first method, a upper bound, $S_{max}$, on the values of $S^{min}_g$ is chosen, and all of the "additional critical points" that are needed to calculate delivery rates for all values of $S_g$ greater than or equal to this value for all groups of pictures are calculated. The process must be carried out for each quality at which the video sequence was encoded. For each encoding quality, we consider each group of pictures, g, in turn, starting with the last and working towards the first, to determine whether it is an "additional critical point". For each such group of pictures, g, we consider a group of pictures, h, starting at group of pictures h=g, and working towards the first group of pictures in the sequence, h=1, and calculate the value of $S^{min}_h$, that is, the minimum start up delay required for group of pictures h such that the point on the cumulative bit curve with group of pictures index g constrains the constant delivery rate that can be used to deliver groups of pictures h to g inclusive in a timely fashion. If $S^{min}_h$ is less than $S_{max}$, we set $S^{min}_h$=$S_{max}$, as doing so will not change the fact that g is critical for the delivery of groups of pictures h to g, and as we are not interested in finding "additional critical points" for values of $S_g$ less than $S_{max}$. We then consider groups of pictures after g, to determine whether the delivery rate required with start up delay $S^{min}_h$ would be sufficient to deliver the remainder of the video sequence. If so, then the group of pictures g is added to the set of "additional critical points". Otherwise it is not added as some later group of pictures after g is more critical for the delivery of group of pictures h with the calculated start up delay $S^{min}_h$.

We illustrate that this method is guaranteed to find all of the "additional critical points" for a given value of $S_{max}$ by considering a group of pictures g that has not been added to this set. We have determined that for each group of pictures h≤g, that g is not critical for h for start up delay $S^{min}_h$≥$S_{max}$. By the definition of $S^{min}_h$, for that value of start up delay, for delivery of groups of pictures h to g inclusive, g is actually critical. But as we have asserted that g is not critical for h, then some group of pictures, i, after g, must be critical for h. Then in consideration of the geometry of the cumulative bit curve, we can see that as the start up delay is increased from $S^{min}_h$, no group of pictures between h and i, which includes the group of pictures g, can not become critical for h. And hence we conclude that group of pictures g can not be critical for any group of pictures h, with h≤g, for start up delays greater than $S^{min}_h$ if it is not critical for a start up delay of $S^{min}_h$.

This method is described formally as follows for a single encoding quality, q, where the amount of data $b_{qg}$ generated for each group of pictures (g=1 . . . G) has already been calculated, and where $S_{max}$ indicates the maximum value of the parameter $S^{min}_h$, measured in group of pictures periods.

500 Initialise the set of "additional critical points" to contain group of pictures G, the last in the video sequence. This will always be an "additional critical point" because, at least, it is critical for the delivery of the last group of pictures in the video sequence. Set a group of pictures index g=G−1.

505 Set the minimum bit rate parameter $R_{min}$ to a large value, such as the total number of bits in the encoded video sequence. Set a cumulative bit count B to zero.

510 Set another group of pictures index h=g.

515 Set $B=B+b_{qh}$

520 Set R=B/(g−h+1)

525 If $R>R_{min}$ go to step 535

530 Set $R_{min}=R$; set $S^{min}_h=0$; go to step 545

535 Set $S^{min}_h=(B/R_{min})-(g-h+1)$

540 If $S^{min}_h<S_{max}$ set $S^{min}_h=S_{max}$

545 Set $R=B/(S^{min}_h+g-h+1)$

550 Set another group of pictures index i=g; set cumulative bit count $D=B-b_{qg}$.

555 Set $D=D+b_{qi}$

560 Set $r=D/(S^{min}_h+i-h+1)$

565 If r>R go to step 580. Group of pictures g is therefore not critical for group of pictures h.

570 Set i=i+1. If i≤G go to step 555

575 Add the point on the cumulative bit curve with group of pictures index g to the set of "additional critical points". Go to step 585. As group of pictures g is critical for group of pictures h, there is no need to consider groups of pictures with lower index than h for the group of pictures g.

580 Set h=h−1. If h≤0 go to step 515

585 Set g=g−1. If g≥0 go to step 505, otherwise terminate.

Figure 20:
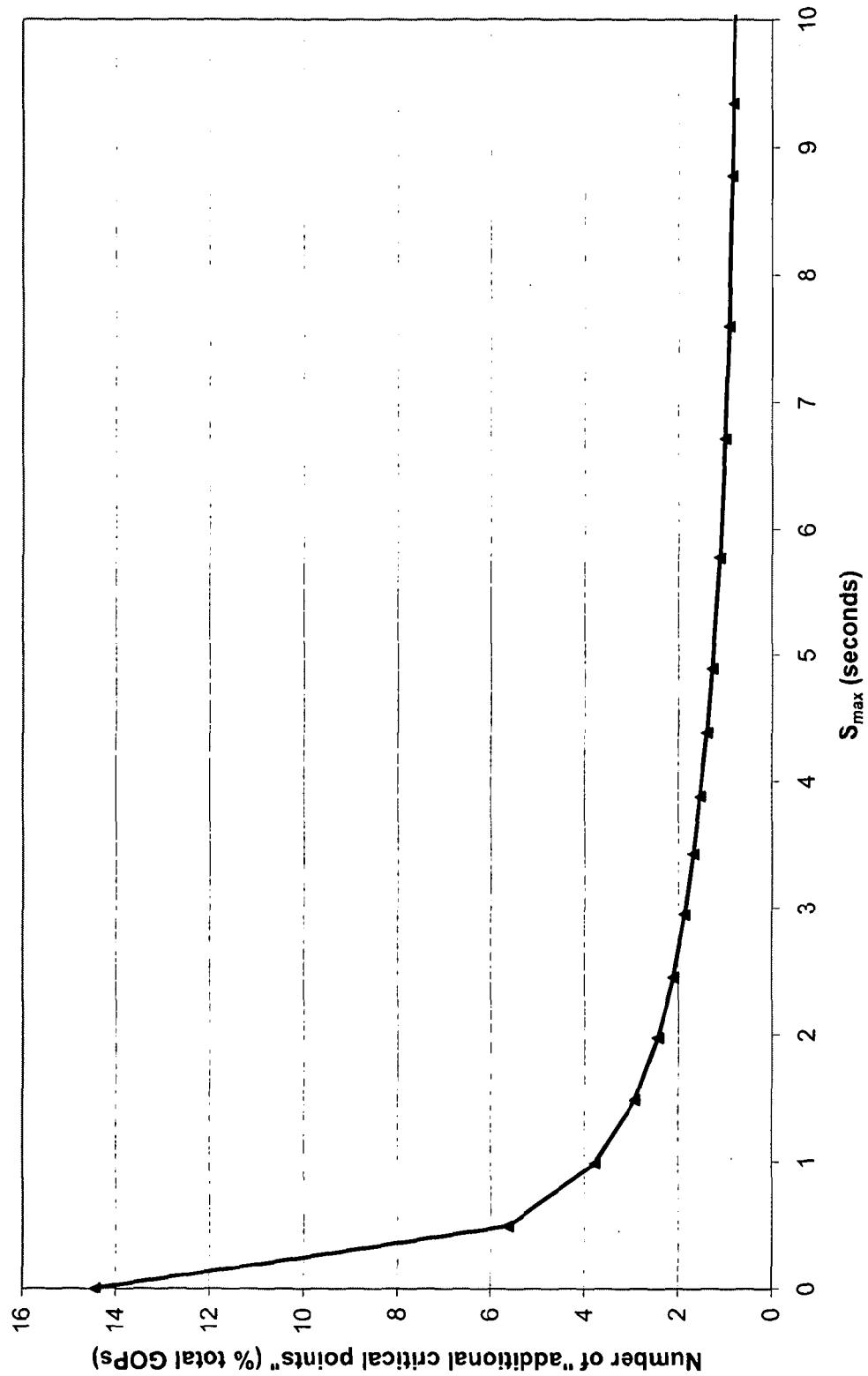
FIG. 20 shows how the number of "additional critical points", expressed as a percentage of the number of groups of pictures in the video sequence, varies with the start up delay parameter, $S_{max}$, averaged over the analysis of a number of real video sequences encoded with constant perceptual quality.

FIG. 20 shows how the number of "additional critical points", expressed as a percentage of the number of groups of pictures in the video sequence, varies with the start up delay parameter, $S_{max}$, averaged over the analysis of a number of real video sequences encoded with constant perceptual quality. We find that a practical implementation point is to set $S_{max}$ to 5 seconds, in which case on average the number of "additional critical points" will be about 1.25% of the number of groups of pictures in the video sequence.

Returning to FIG. 12, therefore, once the additional critical points have been found, the zero start-up delay value is found. As shown in FIG. 14, pictorially this is found by starting with a high rate beginning at Tr, and reducing the rate until a rate is found which just touches the cumulative bit curve at a future point. That rate is then used as the zero-start-up delay rate.

Mathematically, the zero-start-up rate is found using the following equation, where the present GoP for which the rate is being found is g, h refers to future GoPs in the decoding schedule, and $B_h$ and $B_{g-1}$ are the cumulative bit counts for GoPs h and g−1 respectively:

$$\text{Max}\left\{\frac{B_h - B_{g-1}}{h - g + 1}\right\} \quad [7]$$

for all $h \geq g$

As shown in both B.12.18 and B.12.20, both the found additional critical points and zero start-up rates are stored in the meta data. At B.12.22, and 12.24 evaluations are performed to ensure that each GoP in each different quality version of the video content is processed. The complete resulting set of meta-data is stored as meta data 1024.

We will now provide an example of the calculation of a required delivery rate, by considering the video sequence whose cumulative bit curve is shown in FIG. 9. We consider the time at which 800 groups of pictures have already been delivered. With 24 pictures per group of pictures, and 25 pictures per second, this corresponds to a decoding time of 768 seconds. By analysis of the downstairs delivery schedule, on which there are seven critical points, we can determine that had delivery been on the downstairs delivery schedule, then the current time would be 644.9 seconds from the start, and hence 123.1 seconds of data would be buffered. Using the process described above starting at step 500 to calculate the "additional critical points", we find 19 such points when the threshold $S_{max}$ is 5 seconds. We also find that $S^{min}_g$ is 0.28 seconds at this group of pictures, indicating that when the amount of data buffered, measured in units of time, is more than this threshold, the required delivery rate can be calculated from the "additional critical points". We can also calculate the minimum delivery rate $D_{qg}$ of 275075 bits/second that would be needed for delivery if no time were buffered at the decoder i.e. the zero start-up rate.

With the above, therefore, we have shown how data rates for different quality variable bit rate encoded content files can be determined, in dependence on whether the actual delivery rate already received is ahead of schedule or behind schedule. Various pre-calculated data is provided to a client device in advance of the streaming, which is then used during receipt of a video stream to calculate forward delivery rates required for different quality levels. When delivery is ahead of schedule, then forward delivery rates can be calculated using pre-calculated "downstairs critical points" on the decoding schedule, whereas when delivery is behind schedule, and buffer underflow might occur, then forward delivery rates can be calculated using pre-calculated "additional critical points", provided that a minimum amount of data is buffered, but which may be as low as 5 seconds, or even 0.5 s. The use of "additional critical points" provides a good compromise between the amount of pre-calculated data that should be passed to the client and the range of amounts of buffered data for which the required rate could be calculated.

In the above example embodiment it is the client device that is provided with pre-calculated data, and which calculates required delivery rates for different constant quality encoded data, and then selects a quality to be used in dependence on the calculated rates. In other embodiments, however, the rate calculations could be performed at the video content server, as could also the quality selection. In such a case the video content server would provide the selected quality to the client device, which would then need to do no more than decode and reproduce the data that is passed to it. In addition, there would be no need to deliver the encoded video meta data to the client prior to streaming, if the client device is not required to make rate calculations and quality selection decisions.

In addition, in the above described embodiment we have concentrated on the delivery of encoded video data, as such forms one of the primary applications areas of embodiments of the invention. In other embodiments, however, the encoded data may be any encoded data that is encoded at variable bit rate, such as audio data, or the like.

Various further modifications, whether by way of addition, deletion, or substation may be made to the above described

The invention claimed is:

1. A method for delivering encoded content data over a network, the content data being encoded at one or more quality levels, the method comprising:
   determining one or more respective data rates required to deliver the encoded content data at the one or more quality levels; and
   selecting a quality level for delivery in dependence on at least the one or more determined respective data rates;
   the method being characterised in that the determining of a data rate for a particular quality level comprises:
   being provided with pre-calculated data defining one or more critical points of a first type on a decoding schedule of the encoded content data of the particular quality, the critical points of the first type being points at which, for one or more other points on the decoding schedule and assuming that when delivery occurs from those points a minimum threshold amount of encoded content data is buffered, a constant bit rate delivery schedule calculated for the one or more other points such that buffer underflow does not occur is substantially equal to the decoding schedule;
   wherein when actual delivery of the encoded content data is behind a piecewise monotonic decreasing constant bit rate delivery schedule required to deliver the encoded content data from the start so that buffer underflow does not occur, and at least the minimum threshold amount of content is buffered, calculating the data rate required for delivery of remaining encoded data at the particular quality level is performed in dependence on at least the critical points of the first type.

2. A method according to claim 1, wherein a critical point defines a cumulative bit count Bdcp at a specific time Tdcp in the decoding schedule of a set of encoded content data of the particular quality level.

3. A method according to claim 1, and being further provided with pre-calculated data defining one or more critical points of a second type on the decoding schedule of the encoded data at the particular quality level, the critical points of the second type being points at which the piecewise monotonic decreasing constant bit rate delivery schedule is equal to the decoding schedule, wherein the calculating the data rate further comprises;
   calculating a respective data rate for each critical point of the first type on the decoding schedule between the present delivery point and the next critical point of the second type; and
   selecting the maximum calculated data rate as the data rate for the particular quality.

4. A method according to claim 1, wherein the calculation of a data rate in respect of a critical point of the first type further comprises:
   determining a latest timepoint Tr in the set of encoded content data at which already delivered bits will be decoded;
   determining a cumulative bit count Bd at the latest tims Tr;
   determining the present timepoint Ta in the set of encoded content data corresponding to the data just decoded;
   determining the required data rate as the ratio of the difference between the cumulative bit count Bdcp of the critical point of the first type and the cumulative bit count Bd at the latest time Tr, and the difference between the time Tdcp of the critical point of the first type and the present timepoint Ta.

5. A method according to claim 1, wherein when actual delivery of the encoded content data is behind a piecewise monotonic decreasing constant bit rate delivery schedule required to deliver the encoded content data from the start so that buffer underflow does not occur, and there is less than the minimum threshold amount of content buffered, then the data rate is calculated in dependence on a pre-calculated zero start-up delay rate, and a further data rate calculated as if there had been the minimum threshold amount of content data available in the buffer.

6. A method according to claim 5, wherein the data rate is interpolated between the further data rate and the pre-calculated zero start-up delivery rate.

7. A method according to claim 1, and being further provided with pre-calculated data defining one or more critical points of a second type on the decoding schedule of the encoded data at the particular quality level, the critical points of the second type being points at which the piecewise monotonic decreasing constant bit rate delivery schedule is equal to the decoding schedule, wherein when delivery of the encoded content data is ahead of the piecewise monotonic decreasing constant bit rate delivery schedule, calculating the data rate required for delivery of remaining encoded data at the particular quality level in dependence on at least the critical points of the second type.

8. A method according to claim 7, wherein the calculation of the data rate comprises: determining a latest timepoint Tr in the set of encoded content data at which already delivered bits will be decoded;
   determining a cumulative bit count Bd at the latest time Tr;
   determining the present timepoint Ta in the set of encoded content data corresponding to the data just decoded;
   determining the required data rate as the ratio of the difference between the cumulative bit count Bdcp of at least the next critical point of the second type and the cumulative bit count Bd at the latest time Tr, and the difference between the time Tdcp of at least the next critical point of the second type and the present timepoint Ta.

9. A method according to claim 1, wherein the data rate is calculated in respect of a plurality of sets of encoded video data of a respective plurality of qualities.

10. A method according to claim 1, and further comprising storing a set of meta-data relating to encoded content data to be received, the meta-data comprising pre-calculated data relating to properties of the sets of encoded content data of the plurality of qualities.

11. A method according to claim 10, wherein the set of meta data comprises, for each set of encoded content data of a particular quality, for each unit of encoded data in a set, one or more of: i) a cumulative bit count, and ii) a zero-start up delay rate value.

12. A method according to claims 10, wherein the set of meta-data further comprises the pre-calculated data defining the one or more critical points of the first type and/or the one or more critical points of the second type.

13. A method of operating a content server, comprising:
   storing a plurality of sets of encoded content data, encoded at a plurality of constant perceptual qualities;
   streaming the encoded content data of one of the sets of a first quality to a client device operating in accordance with claim 1;
   receiving requests from the client device to stream encoded content data of a second perceptual quality; and
   streaming the encoded content data of the set of the requested second quality to the client device.

14. A method according to claim 12, and further comprising storing meta data relating to the stored sets of encoded content data, the meta-data comprising pre-calculated data relating to properties of the sets of encoded content data of the plurality of qualities, wherein the set of meta data optionally comprises, for each set of encoded content data of a particular quality, for each unit of encoded data in a set, one or more of: i) a cumulative bit count, and ii) a zero-start up delay rate value.

15. A method according to claim 14, wherein the video content server generates the meta-data by analysing the sets of encoded content data.

16. A apparatus comprising:
an interface for receiving encoded content data over a network, the content data being encoded at one or more quality levels; and
a processing system, including a computer processor and a computer readable storage medium, the processing system being at least configured to:
determine one or more respective data rates required to deliver the encoded content data at the one or more quality levels; and
select a quality level for delivery in dependence on at least the one or more determined respective data rates; wherein
determination of a data rate for a particular quality level comprises processing of pre-calculated data defining one or more critical points of a first type on a decoding schedule of the encoded content data of the particular quality, the critical points of the first type being points at which, for one or more other points on the decoding schedule and assuming that when delivery occurs from those points a minimum threshold amount of encoded content data is buffered, a constant bit rate delivery schedule calculated for the one or more other points such that buffer underflow does not occur is substantially equal to the decoding schedule; and
the processing system is further configured to, when actual delivery of the encoded content data is behind a piecewise monotonic decreasing constant bit rate delivery schedule required to deliver the encoded content data from the start so that buffer underflow does not occur, and at least the minimum threshold amount of content is buffered, calculate the data rate required for delivery of remaining encoded data at the particular quality level in dependence on at least the critical points of the first type.

* * * * *